United States Patent
Belocon et al.

(10) Patent No.: US 12,311,607 B2
(45) Date of Patent: May 27, 2025

(54) METHOD AND SYSTEM FOR THREE-DIMENSIONAL PRINTING ON FABRIC

(71) Applicant: Stratasys Ltd., Rehovot (IL)

(72) Inventors: Boris Belocon, Rehovot (IL); Sebastien Herrmann, Even Shmuel (IL); Guy Menchik, RaAnana (IL); Naomi Kaempfer, Antwerp (BE)

(73) Assignee: Stratasys Ltd., Rehovot (IL)

( * ) Notice: Subject to any disclaimer, the term of this patent is extended or adjusted under 35 U.S.C. 154(b) by 185 days.

(21) Appl. No.: 18/018,281

(22) PCT Filed: Jul. 26, 2021

(86) PCT No.: PCT/IL2021/050900
§ 371 (c)(1),
(2) Date: Jan. 27, 2023

(87) PCT Pub. No.: WO2022/024114
PCT Pub. Date: Feb. 3, 2022

(65) Prior Publication Data
US 2023/0286217 A1  Sep. 14, 2023

Related U.S. Application Data

(60) Provisional application No. 63/056,759, filed on Jul. 27, 2020.

(51) Int. Cl.
*B29C 64/393* (2017.01)
*B29C 64/209* (2017.01)
(Continued)

(52) U.S. Cl.
CPC .......... *B29C 64/393* (2017.08); *B29C 64/209* (2017.08); *B29C 64/245* (2017.08);
(Continued)

(58) Field of Classification Search
None
See application file for complete search history.

(56) References Cited

U.S. PATENT DOCUMENTS 3,199,448 A * 8/1965 Jaffa .................... B41F 15/0845
226/162
4,561,354 A * 12/1985 Glantschnig ........ B41F 15/0836
101/115
(Continued)

FOREIGN PATENT DOCUMENTS

CN 109532015 A * 3/2019
CN 111391357 7/2020
(Continued)

OTHER PUBLICATIONS https://www.merriam-webster.com/dictionary/ramp (retrieved Sep. 25, 2024) (Year: 2024).*
(Continued)

*Primary Examiner* — Timothy Kennedy

(57) ABSTRACT

A system for three-dimensional printing comprises an array of nozzles for dispensing building materials, a work tray (12/360) and a jig (402) configured for affixing a fabric (420) to the work tray. A computerized controller operates at least the array of nozzles to dispense a building material in a configured pattern corresponding to a shape of an object on the affixed fabric.

19 Claims, 22 Drawing Sheets

(51) Int. Cl.
  *B29C 64/245* (2017.01)
  *B29C 64/379* (2017.01)
  *B33Y 30/00* (2015.01)
  *B33Y 50/02* (2015.01)
(52) U.S. Cl.
  CPC ............ *B29C 64/379* (2017.08); *B33Y 30/00* (2014.12); *B33Y 50/02* (2014.12)

(56) References Cited

U.S. PATENT DOCUMENTS

| | | | |
|---|---|---|---|
| 6,259,979 | B1 | 7/2001 | Holmquist |
| 6,569,373 | B2 | 5/2003 | Napadensky |
| 6,658,314 | B1 | 12/2003 | Gothait |
| 6,702,438 | B2 * | 3/2004 | Codos ................... D06P 5/2005 347/101 |
| 6,850,334 | B1 | 2/2005 | Gothait |
| 6,863,859 | B2 | 3/2005 | Levy |
| 7,183,335 | B2 | 2/2007 | Napadensky |
| 7,209,797 | B2 | 4/2007 | Kritchman et al. |
| 7,225,045 | B2 | 5/2007 | Gothait et al. |
| 7,300,619 | B2 | 11/2007 | Napadensky et al. |
| 7,500,846 | B2 | 3/2009 | Eshed et al. |
| 7,625,200 | B2 * | 12/2009 | Leavitt ................... B29C 64/209 425/375 |
| 8,926,484 | B1 * | 1/2015 | Comb ................... B23Q 3/155 425/162 |
| 8,993,061 | B2 | 3/2015 | Jones et al. |
| 9,005,710 | B2 * | 4/2015 | Jones ..................... A43D 11/00 427/389.9 |
| 9,031,680 | B2 | 5/2015 | Napadansky |
| 9,227,365 | B2 | 1/2016 | Dikovsky |
| 9,254,640 | B2 * | 2/2016 | Miller ........................ B41J 3/46 |
| 9,402,445 | B2 * | 8/2016 | Miller .................. A43B 3/0084 |
| 9,858,511 | B2 * | 1/2018 | Yamashita ........... G06K 15/021 |
| 11,042,337 | B2 * | 6/2021 | Inoue ................. H04N 1/00267 |
| 2004/0239705 | A1 * | 12/2004 | Arikita ................... B41J 3/4078 347/5 |
| 2005/0280184 | A1 * | 12/2005 | Sayers ................. D21F 1/0027 264/308 |
| 2006/0054039 | A1 | 3/2006 | Kritchman |
| 2014/0020192 | A1 | 1/2014 | Jones et al. |
| 2014/0036455 | A1 * | 2/2014 | Napadensky .......... B33Y 80/00 174/250 |
| 2016/0185041 | A1 * | 6/2016 | Lisagor ................... B29C 70/78 264/257 |
| 2017/0120520 | A1 | 5/2017 | Miller |
| 2017/0129172 | A1 * | 5/2017 | Waatti ...................... A43B 9/00 |
| 2017/0151704 | A1 * | 6/2017 | Go ........................ B29C 48/266 |
| 2017/0157846 | A1 * | 6/2017 | Miller .................... A43B 23/24 |
| 2017/0202309 | A1 * | 7/2017 | Sterman ............. A43B 23/0225 |
| 2017/0225500 | A1 * | 8/2017 | Miller .................. B41M 7/0081 |
| 2017/0259500 | A1 | 9/2017 | Miller |
| 2018/0319099 | A1 | 11/2018 | Sommer |
| 2019/0127913 | A1 | 5/2019 | Sheehan |

FOREIGN PATENT DOCUMENTS

| | | |
|---|---|---|
| EP | 3409472 | 12/2018 |
| JP | 2017-206674 | 11/2017 |
| JP | 2019-509896 | 4/2019 |
| JP | 2019-207557 | 12/2019 |
| WO | WO 2014/015033 | 1/2014 |
| WO | WO 2017/172574 | 10/2017 |
| WO | WO 2018/144354 | 8/2018 |
| WO | WO2019/164973 | 8/2019 |
| WO | WO 2019/209863 | 10/2019 |
| WO | WO 2019/241286 | 12/2019 |
| WO | WO 2020/012468 | 1/2020 |
| WO | WO 2020/141519 | 7/2020 |
| WO | WO 2016/009426 | 6/2021 |
| WO | WO 2022/024114 | 2/2022 |

OTHER PUBLICATIONS https://dictionary.cambridge.org/us/dictionary/english/ramp (retrieved Sep. 25, 2024) (Year: 2024).*
Machine translation of CN 109532015, retrieved from EPO database Sep. 25, 2024 (Year: 2024).*
Communication Pursuant to Article 94(3) EPC Dated Mar. 4, 2024 From the European Patent Office Re. Application No. 21755081.3. (4 Pages).
International Preliminary Report on Patentability Feb. 9, 2023 From the International Bureau of WIPO Re. Application No. PCT/ IL2021/ 050900. (14 Pages).
International Search Report and the Written Opinion Dated Nov. 30, 2021 From the International Searching Authority Re. Application No. PCT/IL2021/050900 (23 Pages).
Notice of Allowance Dated Jan. 18, 2024 From the Israel Patent Office Re. Application No. 300228. (3 Pages).
English Translation Dated Dec. 20, 2024 of Notice of Reasons for Rejection Dated Nov. 19, 2024 From the Japan Patent Office Re. Application No. 2023-505935. (4 Pages).
Notice of Reasons for Rejection Dated Nov. 7, 2024 From the Japan Patent Office Re. Application No. 2023-505935. (3 Pages).

* cited by examiner

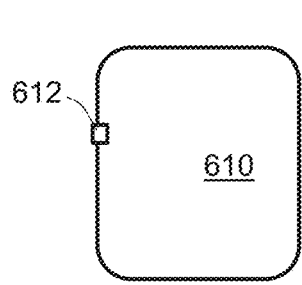 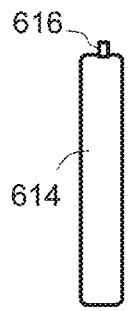 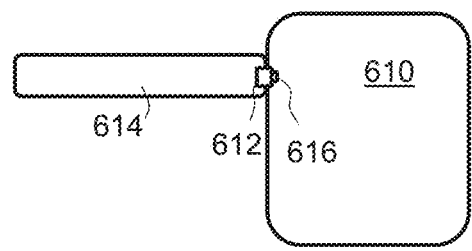
FIG. 11A     FIG. 11B            FIG. 11C
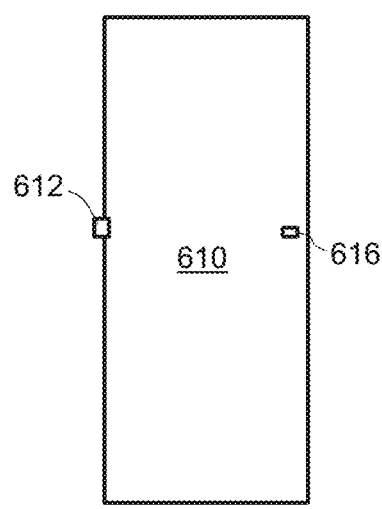 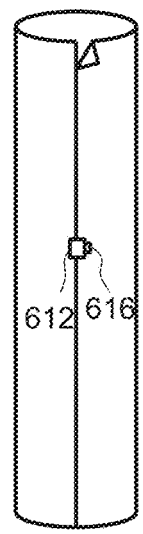
FIG. 12A        FIG. 12B

630

| | | |
|---|---|---|
| fabric property 1 | object property 1 | |
| fabric property 2 | object property 2 | set 1 of printing parameters |
| ⋮ | ⋮ | |
| fabric property $n_1$ | object property $m_1$ | |
| ⋮ | | |
| fabric property 1 | object property 1 | |
| fabric property 2 | object property 2 | set k of printing parameters |
| ⋮ | ⋮ | |
| fabric property $n_k$ | object property $m_k$ | |

FIG. 14

METHOD AND SYSTEM FOR THREE-DIMENSIONAL PRINTING ON FABRIC

RELATED APPLICATION

This application claims the benefit of priority of U.S. Provisional Patent Application No. 63/056,759 filed Jul. 27, 2020, the contents of which are incorporated herein by reference in their entirety.

FIELD AND BACKGROUND OF THE INVENTION

The present invention, in some embodiments thereof, relates to three-dimensional printing and, more particularly, but not exclusively, to a method and system for three-dimensional printing on fabric.

Additive manufacturing (AM) is a technology enabling fabrication of shaped structures directly from computer data via additive formation steps. The basic operation of any AM system consists of slicing a three-dimensional computer model into thin cross sections, translating the result into two-dimensional position data and feeding the data to control equipment which fabricates a three-dimensional structure in a layerwise manner.

Additive manufacturing entails many different approaches to the method of fabrication, including three-dimensional (3D) printing such as 3D inkjet printing, electron beam melting, stereolithography, selective laser sintering, laminated object manufacturing, fused deposition modeling and others.

Some 3D printing processes, for example, 3D inkjet printing, are being performed by a layer by layer inkjet deposition of building materials. Thus, a building material is dispensed from a dispensing head having a set of nozzles to deposit layers on a supporting structure. Depending on the building material, the layers may then be cured or solidified using a suitable device.

Various three-dimensional printing techniques exist and are disclosed in, e.g., U.S. Pat. Nos. 6,259,979, 6,569,373, 6,658,314, 6,850,334, 6,863,859, 7,183,335, 7,209,797, 7,225,045, 7,300,619, 7,500,846, 9,031,680 and 9,227,365, U.S. Published Application No. 20060054039, and International publication No. WO2016/009426, all by the same Assignee, and being hereby incorporated by reference in their entirety.

U.S. Pat. No. 8,993,061 discloses a method of direct 3D printing onto an article of footwear. A 3D pattern for printing is designed. The article of footwear is positioned substantially flat on a tray in a 3D printing system, and a 3D material is printed directly onto the fabric of the article of footwear using the designed pattern.

SUMMARY OF THE INVENTION

According to an aspect of some embodiments of the present invention there is provided a system for three-dimensional printing. The system comprises: an array of nozzles for dispensing building materials; a work tray; a jig configured for affixing a fabric to the work tray; and a computerized controller configured for operating at least the array of nozzles to dispense a building material in a configured pattern corresponding to a shape of an object on the affixed fabric.

According to some embodiments of the invention the jig is configured for stretching the fabric.

According to some embodiments of the invention the system further comprises a robotic mechanism connected to the jig and configured for placing the jig on the tray.

According to some embodiments of the invention the robotic mechanism is configured for flipping an orientation of the jig with respect to a horizontal plane.

According to some embodiments of the invention the computerized controller is configured for operating at least the array of nozzles to dispense the building material onto the tray, and to operate the robotic mechanism to place the jig on the tray, following the dispensing of the building material onto the tray and prior to the dispensing of the building material on the affixed fabric.

According to some embodiments of the invention the system comprises a position tracking system configured for determining a position of the jig relative to the work tray, wherein the computerized controller is configured for executing registration procedure based on the position and to operate the array of nozzles responsively to the registration.

According to some embodiments of the invention the jig comprises marks, the marks being identifiable by the position tracking system for determining the position.

According to some embodiments of the invention the system comprises a radiation source, and wherein the work tray has reflectivity of at least 50% to radiation emitted by the radiation source.

According to some embodiments of the invention the work tray comprises a fluid channel, and the system comprises a fluid delivery system for generating a flow of fluid within the fluid channel.

According to an aspect of some embodiments of the present invention there is provided a system for three-dimensional printing. The system comprises: an array of nozzles for dispensing building materials; a radiation source for emitting radiation solidifying the dispensing building materials; a work tray, characterized by reflectivity of at least 50% to the radiation; and a computerized controller configured for operating at least the array of nozzles to dispense a building material in a configured pattern corresponding to a shape of an object on a fabric.

According to an aspect of some embodiments of the present invention there is provided a system for three-dimensional printing. The system comprises: an array of nozzles for dispensing building materials; a work tray having a fluid channel; a fluid delivery system for generating a flow of fluid within the fluid channel; and a computerized controller configured for operating at least the array of nozzles to dispense a building material in a configured pattern corresponding to a shape of an object on a fabric.

According to some embodiments of the invention the system comprises an additive dispensing system in fluid communication with a container containing an additive other than a building material for three-dimensional printing, for dispensing the additive onto the fabric.

According to an aspect of some embodiments of the present invention there is provided a system for three-dimensional printing. The system comprises: an array of nozzles for dispensing building materials; a work tray; a computerized controller configured for operating at least the array of nozzles to dispense a building material in a configured pattern corresponding to a shape of an object on a fabric; and an additive dispensing system in fluid communication with a container containing an additive other than a building material for three-dimensional printing, for dispensing the additive onto the fabric.

According to some embodiments of the invention the computerized controller is configured for operating the additive dispensing system.

According to some embodiments of the invention the array and the additive dispensing system are mounted on the same printing block.

According to some embodiments of the invention the array and the additive dispensing system are configured to move independently along a horizontal direction.

According to some embodiments of the invention the array and the additive dispensing system are configured to move independently along a vertical direction.

According to an aspect of some embodiments of the present invention there is provided a system for three-dimensional printing on a fabric. The system comprises: a printing chamber having therein an array of nozzles for dispensing building materials, and a work tray; a computerized controller configured for operating at least the array of nozzles to dispense a building material in a configured pattern corresponding to a shape of an object on a fabric; and a fabric let-off for unrolling a fabric roll, and feeding unrolled fabric to the printing chamber.

According to some embodiments of the invention the system comprises a cutting device for cutting sections of the unrolled fabric.

According to some embodiments of the invention the system comprises a fabric take-up for rolling the fabric following the dispensing.

According to some embodiments of the invention fabric take-up receives the fabric from the fabric let-off via the printing chamber, thereby providing a continuous fabric roll printed with three-dimensional objects thereon.

According to an aspect of some embodiments of the present invention there is provided a system for three-dimensional printing. The system comprises: an array of nozzles for dispensing building materials; a work tray; an imaging system positioned for imaging a fabric placed on the work tray; and a computerized controller configured for receiving image data from the imaging system, processing the image data to identify patterns on the fabric, and operating at least the array of nozzles to dispense a building material in a configured pattern corresponding to a shape of an object on a fabric at locations selected relative to the identified features.

According to some embodiments of the invention the imaging system comprises a pixelated image sensor.

According to some embodiments of the invention the imaging system comprises a scanner.

According to some embodiments of the invention the work tray is operatively associated with a radiation source constituted to emit radiation upwards so as to solidify the dispensed building materials from below.

According to some embodiments of the invention the system comprises a static platform surrounding the work tray, wherein the jig comprises a frame configured for affixing the fabric to the platform peripherally with respect to the work tray.

According to some embodiments of the invention at least one of the platform and the frame comprises protruding elements or a rough surface. According to some embodiments of the invention both the platform and the frame comprise protruding elements or a rough surface complementary to each other.

According to some embodiments of the invention an edge of a top surface of the work tray is formed as at least one of a fillet and a chamfer.

According to some embodiments of the invention the system comprises a ramp structure mountable or placeable over the work tray to define a space above the work tray, wherein an upper surface of the ramp structure is configured to support a horizontal portion of the fabric and the space is configured to receive a hanging portion of the fabric, and wherein the computerized controller is configured to control the array of nozzles to dispense the building material only on the upper surface.

According to some embodiments of the invention the computerized controller is configured to adjust a vertical position of the work tray so as to compensate for a height of the ramp structure above the work tray.

According to an aspect of some embodiments of the present invention there is provided a method of three-dimensional printing. The system comprises: applying a stiffening substance to a fabric; and operating an array of nozzles for dispensing building materials on the fabric in a configured pattern corresponding to a shape of an object.

According to some embodiments of the invention the applying the stiffening substance comprises applying the stiffening substance on a same side of the fabric on which the building materials are dispensed.

According to some embodiments of the invention the applying the stiffening substance comprises applying the stiffening substance on an opposite side of the fabric on which the building materials are dispensed.

According to some embodiments of the invention the applying the stiffening substance comprises placing a sheet containing the stiffening substance on the fabric and heating the sheet.

According to some embodiments of the invention the applying the stiffening substance comprises placing a sheet containing the stiffening substance beneath the fabric and heating the sheet.

According to some embodiments of the invention the operating the array of nozzles comprises operating a three-dimensional printing system which comprises the array of nozzles and a work tray, and wherein the applying the stiffening substance comprises placing a sheet containing the stiffening substance onto the tray, placing the fabric onto the sheet, and heating the tray.

According to some embodiments of the invention the stiffening substance is an oily substance.

According to some embodiments of the invention the stiffening substance comprises wax.

According to an aspect of some embodiments of the present invention there is provided a method of three-dimensional printing. The method comprises: operating a first array of nozzles for dispensing a first building material on a fabric to form an adhesion region on a fabric; and operating a second array of nozzles for dispensing a second building material on the adhesion region in a configured pattern corresponding to a shape of an object.

According to some embodiments of the invention the fabric is on a work tray and the method comprises obtaining registration data pertaining to a position of the fabric relative to the work tray, and registering dispensing locations of the building materials based on the registration data.

According to some embodiments of the invention the second building material comprises a generally colorless and transparent building material.

According to an aspect of some embodiments of the present invention there is provided a method of three-dimensional printing. The method comprises: dispensing at least one building material on a receiving surface to form a securing element thereon; placing a fabric on the securing element; dispensing at least one building material on the fabric to form a penetration element penetrating through the fabric and connected to the securing element; dispensing at least one building material on the penetration element in a configured pattern corresponding to a shape of an object.

According to an aspect of some embodiments of the present invention there is provided a method of three-dimensional printing. The method comprises: dispensing at least one building material on a receiving surface in a configured pattern corresponding to a shape of an object; placing a fabric on the object; dispensing at least one building material on the fabric to form a penetration element penetrating through the fabric and connected to the object; dispensing at least one building material on the penetration element to form another object.

According to some embodiments of the invention the other object is a securing element.

According to some embodiments of the invention the other object is a decorative object.

According to some embodiments of the invention at least one of the object and the other object is a thermal protective object.

According to some embodiments of the invention the method comprises dispensing at least one building material on a work tray to form a sacrificial structure, wherein the receiving surface is the sacrificial structure.

According to some embodiments of the invention the dispensing of the at least one building material to form the penetration element, comprises dispensing a generally colorless and transparent building material.

According to some embodiments of the invention the method comprises irradiating the building material by solidifying radiation after the dispensing of the at least one building material to form the penetration element, and after the penetration element penetrates through the fabric while being in a liquid state.

According to some embodiments of the invention the method comprises dispensing at least one building material to form a sacrificial layer on exposed fabric portions, and irradiating all dispensed building materials non-selectively by solidifying radiation.

According to some embodiments of the invention the method comprises obtaining registration data pertaining to a position of the fabric relative to the work tray, and registering dispensing locations of the building materials based on the registration data.

According to an aspect of some embodiments of the present invention there is provided a method of fabricating a garment. The method comprises: dispensing building materials on a first fabric element to form a female snap connector; dispensing building materials on a second fabric element to form a male snap connector; and connecting the female snap connector to the male snap connector, thereby fabricating the garment.

According to an aspect of some embodiments of the present invention there is provided a method of fabricating a garment. The method comprises: dispensing building materials on a fabric element to form a female snap connector and a male snap connector laterally displaced from the female snap connector; folding the fabric element to align the connectors; and connecting the female snap connector to the male snap connector, thereby fabricating the garment.

According to some embodiments of the invention the method comprises applying at least one additive other than a building material for three-dimensional printing to the fabric prior to the dispensing of the building materials and/or subsequently to the dispensing of the building materials.

According to an aspect of some embodiments of the present invention there is provided a method of three-dimensional printing. The method comprises: operating an array of nozzles for dispensing building materials on a fabric in a configured pattern corresponding to a shape of an object; and applying at least one additive other than a building material for three-dimensional printing to the fabric prior to the dispensing of the building materials and/or subsequently to the dispensing of the building materials.

According to some embodiments of the invention the at least one additive comprises a priming solution selected from the group consisting of an adhesive solution, and a pore size modifying solution, and wherein the applying of the priming solution is prior to the dispensing.

According to some embodiments of the invention the at least one additive comprises a finishing solution selected from the group consisting of radiation protective solution, glossy finish solution, and matte finish solution, and wherein the applying of the finishing solution is after the dispensing.

According to some embodiments of the invention the at least one additive comprises a masking solution, and wherein the applying of the masking solution is prior to the dispensing and is executed selectively at locations not to be occupied by the object.

According to some embodiments of the invention the at least one additive comprises a non-active formulation capable of being activated in situ, and wherein the method comprises activating the formulation following the application thereof to the fabric.

According to some embodiments of the invention the activating is by radiation.

According to some embodiments of the invention the activating is by heat.

According to some embodiments of the invention the activating is by chemical reaction between the additive and one or more of the building materials.

According to some embodiments of the invention the applying the additive(s) comprises directing an aerosol of the additive to the fabric.

According to some embodiments of the invention the applying the additive(s) comprises depositing droplets of the additive at discrete addressable locations on the fabric.

According to some embodiments of the invention there are at least two additives, wherein the applying the additive(s) comprises depositing droplets of the additives at discrete addressable locations on the fabric in an interlaced manner.

According to some embodiments of the invention there is a first additive and a second additive, wherein the first and the second additives chemically react with each other upon contact, wherein the applying the additive(s) comprises depositing the additives separately such as to induce subsequent reaction therebetween on the fabric.

According to an aspect of some embodiments of the present invention there is provided a method of three-dimensional printing. The method comprises: receiving, via a user interface, data pertaining to a property of a fabric; receiving data pertaining to a property of an object to be printed on the fabric; accessing a computer readable medium storing a library having a plurality of entries, each including a library fabric property, a library object property, and a set of printing parameters; searching the library for an entry best matching the received properties; and operating a three-dimensional printing system according to a set of printing parameters of the entry to form the object on the fabric.

According to some embodiments of the invention the property of the fabric comprises at least one property selected from the group consisting of a type of the fabric, a pore size of the fabric, and a weaving pattern of the fabric.

According to some embodiments of the invention the property of the object comprises at least one property selected from the group consisting of a thickness of the object, a shape of the object, and a rigidity of the object.

According to some embodiments of the invention the set of printing parameters comprises at least one of: (i) a priming solution application sequence, (ii) a building material, (iii) a building material dispensing sequence, and (iv) a finishing solution application sequence.

According to some embodiments of the invention the method comprises receiving a scan of a body of an individual or an external body part thereof, and selecting at least one property of the object based on the scan.

According to some embodiments of the invention the object is selected from the group consisting of a lenticular, a prismatic object, an object that is reflective to visible light, an object that is transparent to visible light but reflective to non-visible light, a fluorescent object, and a waveguide.

According to some embodiments of the invention the object is capable of changing an optical, mechanical, and/or geometrical property in response to an environmental change.

According to some embodiments of the invention the environmental change comprises at least one change selected from the group consisting of a change in temperature, a change in humidity, and a change in electromagnetic content of the environment.

According to some embodiments of the invention the object comprises a pharmaceutical agent.

According to some embodiments of the invention the pharmaceutical agent is selected from the group consisting of an anti-bacterial agent and an anti-viral agent.

According to some embodiments of the invention the object comprises a cosmetic agent.

According to some embodiments of the invention the object comprises a heating element.

According to some embodiments of the invention the object comprises a cooling element.

According to some embodiments of the invention the object comprises a circuit.

According to some embodiments of the invention the object comprises a cavity for receiving a foreign object.

According to some embodiments of the invention the object comprises a female or a male part of a snap connector.

According to some embodiments of the invention the method comprises folding the fabric over a ramp structure, and mounting or placing the ramp structure on the work tray to such that a horizontal portion of the fabric is supported by upper surface of the ramp structure and a hanging portion of the fabric is folded into a space below the upper surface but above the work tray, wherein the dispensing is only on the upper surface.

According to some embodiments of the invention the method comprises adjusting a vertical position of the work tray to compensate for a height of the upper surface of the ramp structure above the work tray.

According to an aspect of some embodiments of the present invention there is provided a system for three-dimensional printing. The system comprises: an array of nozzles for dispensing building materials; a work tray, operatively associated with a radiation source constituted to emit radiation upwards so as to solidify the dispensed building materials from below; and a computerized controller configured for operating at least the array of nozzles to dispense a building material in a configured pattern corresponding to a shape of an object, and for operating the radiation source following the dispensing.

According to some embodiments of the invention the computerized controller is configured for operating the radiation source in a spatially-selective manner.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 11A-C are schematic illustrations of a method suitable for fabricating a garment from two or more fabric elements, according to some embodiments of the present invention;

FIGS. 12A and 12B are schematic illustrations of a method suitable for fabricating a folded garment, according to some embodiments of the present invention;

FIG. 14 is schematic illustration of a library of properties and printing parameters, according to some embodiments of the present invention.

DESCRIPTION OF SPECIFIC EMBODIMENTS OF THE INVENTION

Figure 1A:
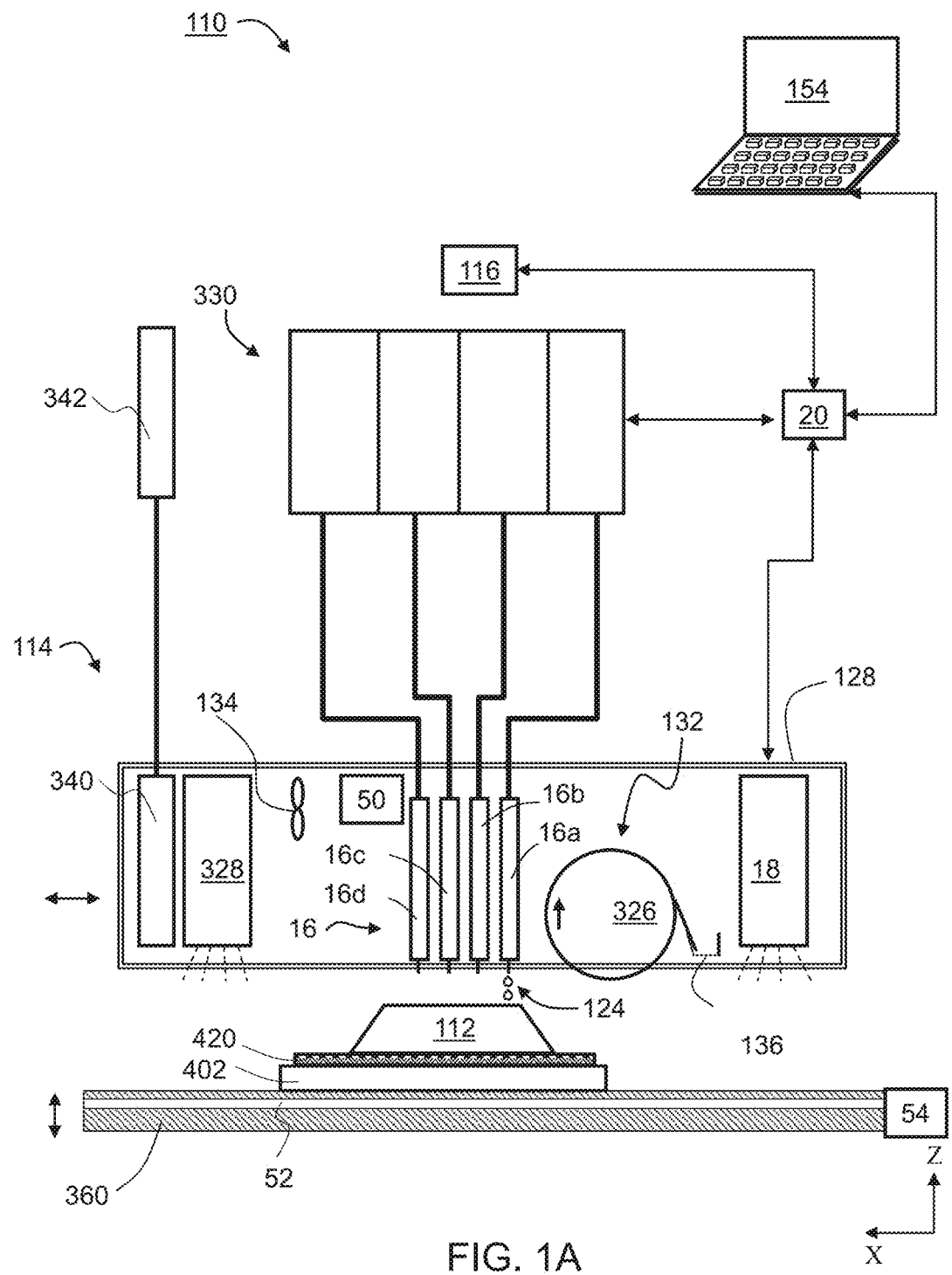
FIGS. 1A-D are schematic illustrations of an additive manufacturing system according to some embodiments of the invention.

The present invention, in some embodiments thereof, relates to three-dimensional printing and, more particularly, but not exclusively, to a method and system for printing objects on fabric.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The method and system of the present embodiments manufacture three-dimensional objects based on computer object data in a layerwise manner by forming a plurality of layers in a configured pattern corresponding to the shape of the objects. The computer object data can be in any known format, including, without limitation, a Standard Tessellation Language (STL) or a StereoLithography Contour (SLC) format, an OBJ File format (OBJ), a 3D Manufacturing Format (3MF), Virtual Reality Modeling Language (VRML), Additive Manufacturing File (AMF) format, Drawing Exchange Format (DXF), Polygon File Format (PLY) or any other format suitable for Computer-Aided Design (CAD).

The term "object" as used herein refers to a whole object or a part thereof.

Each layer is formed by an additive manufacturing apparatus which scans a two-dimensional surface and patterns it. While scanning, the apparatus visits a plurality of target locations on the two-dimensional layer or surface, and decides, for each target location or a group of target locations, whether or not the target location or group of target locations is to be occupied by building material, and which type of building material is to be delivered thereto. The decision is made according to a computer image of the surface.

In preferred embodiments of the present invention the AM comprises three-dimensional printing, more preferably three-dimensional inkjet printing. In these embodiments a building material is dispensed from a printing head having one or more arrays of nozzles to deposit building material in layers on a receiving surface. The AM apparatus thus dispenses building material in target locations which are to be occupied and leaves other target locations void. The apparatus typically includes a plurality of arrays of nozzles, each of which can be configured to dispense a different building material. This is typically achieved by providing the printing head with a plurality of fluid channels are separated from each other such that there is no fluid communication therebetween, wherein each channel receives a different building material through a separate inlet and conveys it to a different array of nozzles.

Thus, different target locations can be occupied by different building materials. The types of building materials can be categorized into two major categories: modeling material and support material. Typically, the building materials are solvent-free (e.g. do not contain water or any organic solvent) and/or are dispensed at a temperature above 40° C., above 50° C. or above 60° C. The support material serves as a supporting matrix or construction for supporting the object or object parts during the fabrication process and/or other purposes, e.g., providing hollow or porous objects. Support constructions may additionally include modeling material elements, e.g. for further support strength.

The modeling material is generally a composition which is formulated for use in additive manufacturing and which is able to form a three-dimensional object on its own, i.e., without having to be mixed or combined with any other substance.

The final three-dimensional object is made of the modeling material or a combination of modeling materials or modeling and support materials or modification thereof (e.g., following curing). All these operations are well-known to those skilled in the art of solid freeform fabrication.

In some exemplary embodiments of the invention an object is manufactured by dispensing two or more different modeling materials, each material from a different array of nozzles (belonging to the same or different printing heads) of the AM apparatus. In some embodiments, two or more such arrays of nozzles that dispense different modeling materials are both located in the same printing head of the AM apparatus. In some embodiments, arrays of nozzles that dispense different modeling materials are located in separate printing heads, for example, a first array of nozzles dispensing a first modeling material is located in a first printing head, and a second array of nozzles dispensing a second modeling material is located in a second printing head.

In some embodiments, an array of nozzles that dispense a modeling material and an array of nozzles that dispense a support material are both located in the same printing head. In some embodiments, an array of nozzles that dispense a modeling material and an array of nozzles that dispense a support material are located in separate printing heads.

Figure 2A:
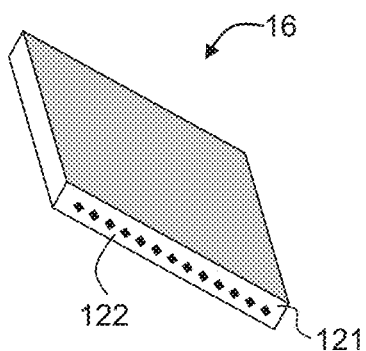
FIGS. 2A-2C are schematic illustrations of printing heads according to some embodiments of the present invention.
Figure 2B:
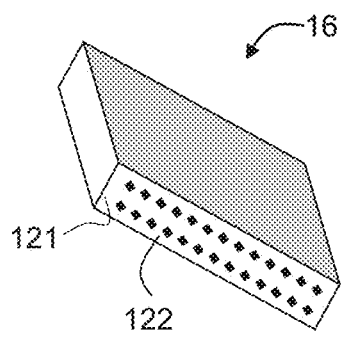
Figure 2C:
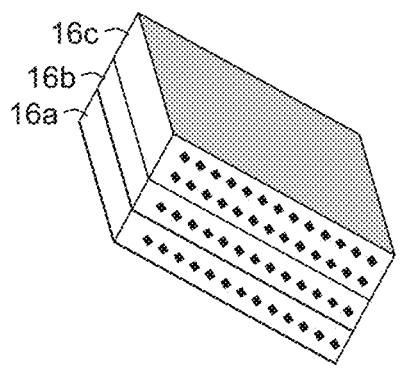

A representative and non-limiting example of a system 110 suitable for AM of an object 112 according to some embodiments of the present invention is illustrated in FIG. 1A. System 110 comprises an additive manufacturing apparatus 114 having a dispensing unit 16 which comprises a plurality of printing heads. Each head preferably comprises one or more arrays of nozzles 122, typically mounted on an orifice plate 121, as illustrated in FIGS. 2A-C described below, through which a liquid building material 124 is dispensed.

Preferably, but not obligatorily, apparatus 114 is a three-dimensional printing apparatus, in which case the printing heads are printing heads, and the building material is dispensed via inkjet technology. This need not necessarily be the case, since, for some applications, it may not be necessary for the additive manufacturing apparatus to employ three-dimensional printing techniques. Representative examples of additive manufacturing apparatus contemplated according to various exemplary embodiments of the present invention include, without limitation, fused deposition modeling apparatus and fused material deposition apparatus.

Each printing head is optionally and preferably fed via one or more building material reservoirs which may optionally include a temperature control unit (e.g., a temperature sensor and/or a heating device), and a material level sensor. To dispense the building material, a voltage signal is applied to the printing heads to selectively deposit droplets of material via the printing head nozzles, for example, as in piezoelectric inkjet printing technology. Another example includes thermal inkjet printing heads. In these types of heads, there are heater elements in thermal contact with the building material, for heating the building material to form gas bubbles therein, upon activation of the heater elements by a voltage signal. The gas bubbles generate pressures in the building material, causing droplets of building material to be ejected through the nozzles. Piezoelectric and thermal printing heads are known to those skilled in the art of solid freeform fabrication. For any types of inkjet printing heads, the dispensing rate of the head depends on the number of nozzles, the type of nozzles and the applied voltage signal rate (frequency).

Preferably, but not obligatorily, the overall number of dispensing nozzles or nozzle arrays is selected such that half of the dispensing nozzles are designated to dispense support material and half of the dispensing nozzles are designated to dispense modeling material, i.e. the number of nozzles jetting modeling materials is the same as the number of nozzles jetting support material. In the representative example of FIG. 1A, four printing heads 16a, 16b, 16c and 16d are illustrated. Each of heads 16a, 16b, 16c and 16d has a nozzle array. In this Example, heads 16a and 16b can be designated for modeling material/s and heads 16c and 16d can be designated for support material. Thus, head 16a can dispense one modeling material, head 16b can dispense another modeling material and heads 16c and 16d can both dispense support material. In an alternative embodiment, heads 16c and 16d, for example, may be combined in a single head having two nozzle arrays for depositing support material. In a further alternative embodiment, any one or more of the printing heads may have more than one nozzle arrays for depositing more than one material, e.g. two nozzle arrays for depositing two different modeling materials or a modeling material and a support material, each formulation via a different array or number of nozzles.

Yet it is to be understood that it is not intended to limit the scope of the present invention and that the number of modeling material printing heads (modeling heads) and the number of support material printing heads (support heads) may differ. Generally, the number of arrays of nozzles that dispense modeling material, the number of arrays of nozzles that dispense support material, and the number of nozzles in each respective array are selected such as to provide a predetermined ratio, a, between the maximal dispensing rate of the support material and the maximal dispensing rate of modeling material. The value of the predetermined ratio, a, is preferably selected to ensure that in each formed layer, the height of modeling material equals the height of support material. Typical values for a are from about 0.6 to about 1.5.

As used herein throughout the term "about" refers to ±10%.

For example, for a=1, the overall dispensing rate of support material is generally the same as the overall dispensing rate of the modeling material when all the arrays of nozzles operate.

Apparatus 114 can comprise, for example, M modeling heads each having m arrays of p nozzles, and S support heads each having s arrays of q nozzles such that M×m×p=S×s×q. Each of the M×m modeling arrays and S×s support arrays can be manufactured as a separate physical unit, which can be assembled and disassembled from the group of arrays. In this embodiment, each such array optionally and preferably comprises a temperature control unit and a material level sensor of its own, and receives an individually controlled voltage for its operation.

Apparatus 114 can further comprise a solidifying device 18 which can include any device configured to emit light, heat or the like that may cause the deposited material to harden. For example, solidifying device 18 can comprise one or more radiation sources, which can be, for example, an ultraviolet or visible or infrared lamp, or other sources of electromagnetic radiation, or electron beam source, depending on the modeling material being used. In some embodiments of the present invention, solidifying device 18 serves for curing or solidifying the modeling material.

In addition to solidifying device 18, apparatus 114 optionally and preferably comprises an additional radiation source 328 for solvent evaporation. Radiation source 328 optionally and preferably generates infrared radiation. In various exemplary embodiments of the invention solidifying device 18 comprises a radiation source generating ultraviolet radiation, and radiation source 328 generates infrared radiation.

In some embodiments of the present invention apparatus 114 comprises cooling system 134 such as one or more fans or the like.

The printing head(s) and radiation source are preferably mounted in a frame or block 128 which is preferably operative to reciprocally move over a tray 360, which serves as the working surface. In some embodiments of the present invention the radiation sources are mounted in the block such that they follow in the wake of the printing heads to at least partially cure or solidify the materials just dispensed by the printing heads. Tray 360 is positioned horizontally. According to the common conventions an X-Y-Z Cartesian coordinate system is selected such that the X-Y plane is parallel to tray 360. Tray 360 is preferably configured to move vertically (along the Z direction), typically downward. In various exemplary embodiments of the invention, apparatus 114 further comprises one or more leveling devices 32, e.g. a roller 326. Leveling device 326 serves to straighten, level and/or establish a thickness of the newly formed layer prior to the formation of the successive layer thereon. Leveling device 326 preferably comprises a waste collection device 136 for collecting the excess material generated during leveling. Waste collection device 136 may comprise any mechanism that delivers the material to a waste tank or waste cartridge.

In the schematic illustrations of FIG. 1A, the edge(s) of tray 360 are provided with straight corners. However, this need not necessarily be the case, since, for some applications, particularly when tray 360 is in contact with a fabric on which the object is printed, it may be desired for the edge(s) of the top surface of tray 360 to be formed as a fillet and/or a chamfer (see chamfer 411 in FIGS. 4E and 4F).

In use, the printing heads of unit 16 move in a scanning direction, which is referred to herein as the X direction, and selectively dispense building material in a predetermined configuration in the course of their passage over tray 360. The building material typically comprises one or more types of support material and one or more types of modeling material. The passage of the printing heads of unit 16 is followed by the curing of the modeling material(s) by radiation source 126. In the reverse passage of the heads, back to their starting point for the layer just deposited, an additional dispensing of building material may be carried out, according to predetermined configuration. In the forward and/or reverse passages of the printing heads, the layer thus formed may be straightened by leveling device 326, which preferably follows the path of the printing heads in their forward and/or reverse movement. Once the printing heads return to their starting point along the X direction, they may move to another position along an indexing direction, referred to herein as the Y direction, and continue to build the same layer by reciprocal movement along the X direction. Alternately, the printing heads may move in the Y direction between forward and reverse movements or after more than one forward-reverse movement. The series of scans performed by the printing heads to complete a single layer is referred to herein as a single scan cycle.

Once the layer is completed, tray 360 is lowered in the Z direction to a predetermined Z level, according to the desired thickness of the layer subsequently to be printed. The procedure is repeated to form three-dimensional object 112 in a layerwise manner.

In another embodiment, tray 360 may be displaced in the Z direction between forward and reverse passages of the printing head of unit 16, within the layer. Such Z displacement is carried out in order to cause contact of the leveling device with the surface in one direction and prevent contact in the other direction.

System 110 optionally and preferably comprises a supply system 330 which comprises the building material containers or cartridges and supplies a plurality of building materials to fabrication apparatus 114.

A controller 20 controls fabrication apparatus 114 and optionally and preferably also supply system 330. Controller 20 typically includes an electronic circuit configured to perform the controlling operations. Controller 20 preferably communicates with a data processor 154 which transmits digital data pertaining to fabrication instructions based on computer object data, e.g., a CAD configuration represented on a computer readable medium in a form of a Standard Tessellation Language (STL) format or the like. Typically, controller 20 controls the voltage applied to each printing head or each nozzle array and the temperature of the building material in the respective printing head or respective nozzle array.

Once the manufacturing data is loaded to controller 20 it can operate without user intervention. In some embodiments, controller 20 receives additional input from the operator, e.g., using data processor 154 or using a user interface 116 communicating with controller 20.

User interface 116 can be of any type known in the art, such as, but not limited to, a keyboard, a touch screen and the like. For example, controller 20 can receive, as additional input, one or more building material types and/or attributes, such as, but not limited to, color, characteristic distortion and/or transition temperature, viscosity, electrical property, magnetic property. Other attributes and groups of attributes are also contemplated.

Figure 1B:
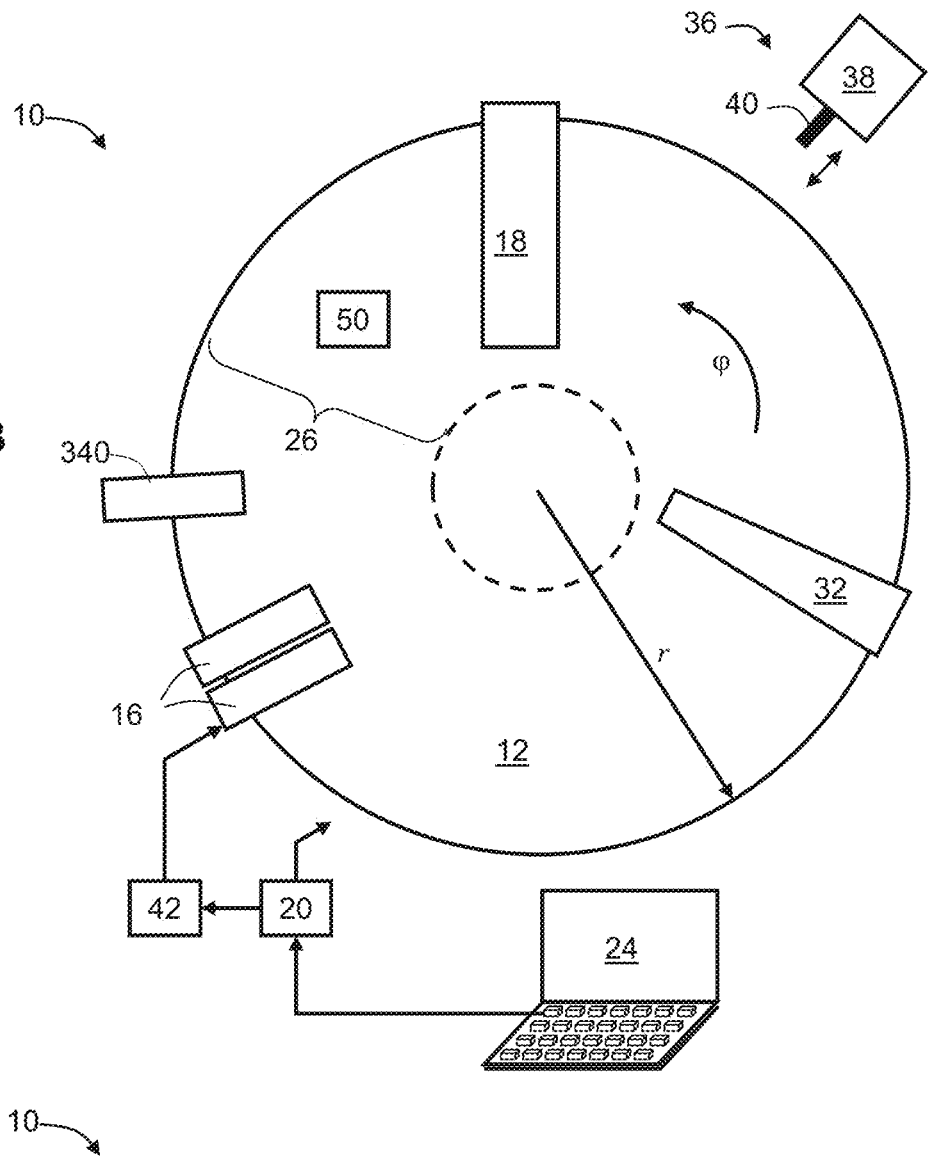
Figure 1C:
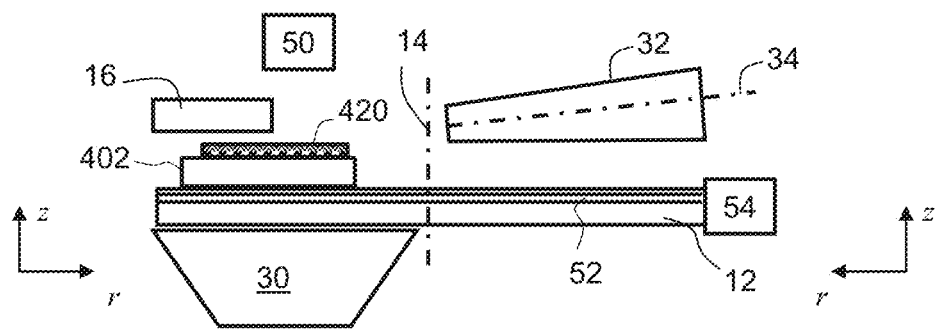
Figure 1D:
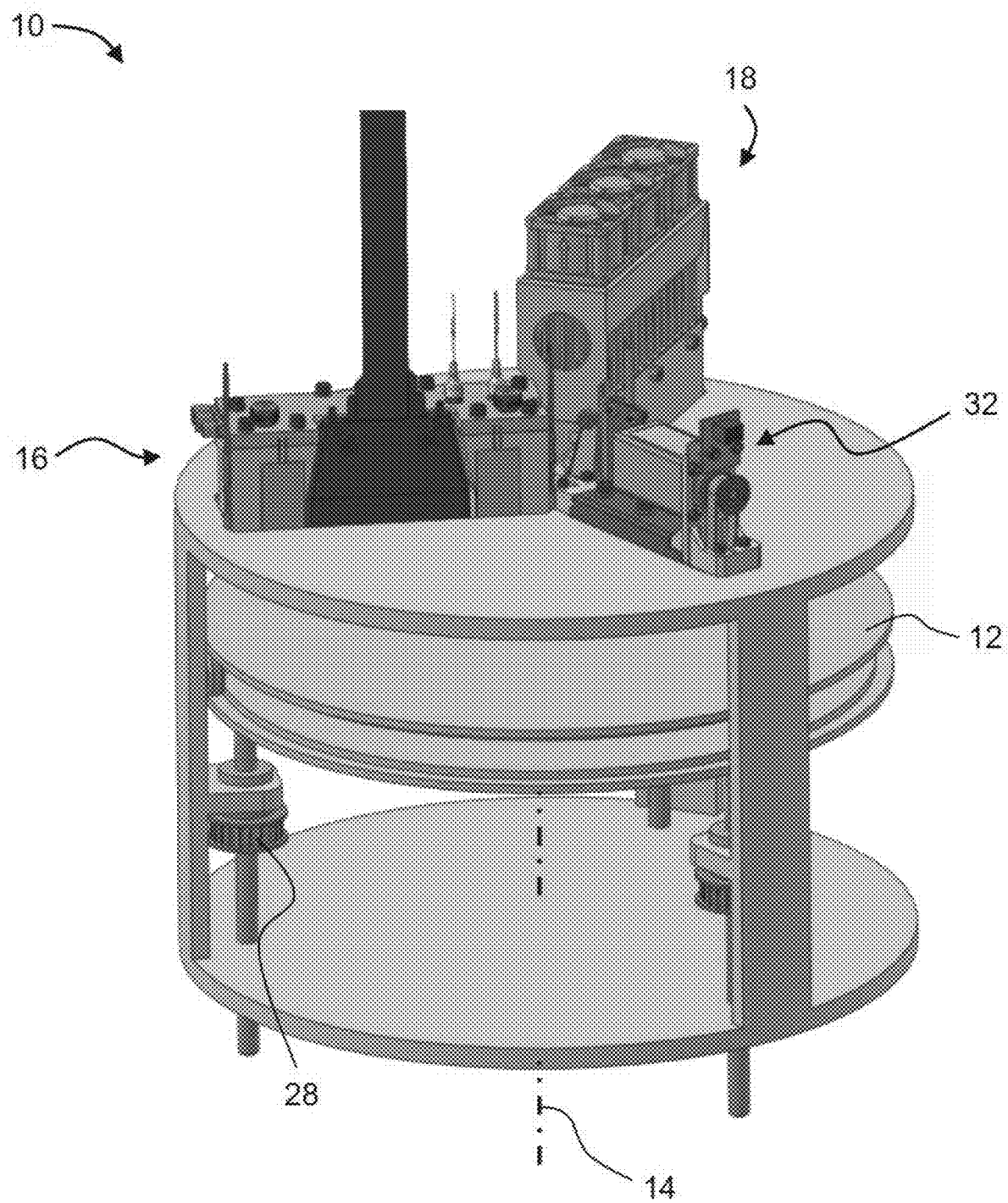

Another representative and non-limiting example of a system 10 suitable for AM of an object according to some embodiments of the present invention is illustrated in FIGS. 1B-D. FIGS. 1B-D illustrate a top view (FIG. 1B), a side view (FIG. 1C) and an isometric view (FIG. 1D) of system 10.

In the present embodiments, system 10 comprises a tray 12 and a plurality of inkjet printing heads 16, each having one or more arrays of nozzles with respective one or more pluralities of separated nozzles. The material used for the three-dimensional printing is supplied to heads 16 by a building material supply system 42. Tray 12 can have a shape of a disk or it can be annular. Non-round shapes are also contemplated, provided they can be rotated about a vertical axis. In the schematic illustrations of FIG. 1C, the edge(s) of tray 12 are provided with straight corners. However, as in the case of tray 360 above, for some applications, particularly when tray 12 is in contact with a fabric on which the object is printed, it may be desired for the edge(s) of the top surface of tray 12 to be formed as a fillet and/or a chamfer.

Tray 12 and heads 16 are optionally and preferably mounted such as to allow a relative rotary motion between tray 12 and heads 16. This can be achieved by (i) configuring tray 12 to rotate about a vertical axis 14 relative to heads 16, (ii) configuring heads 16 to rotate about vertical axis 14 relative to tray 12, or (iii) configuring both tray 12 and heads 16 to rotate about vertical axis 14 but at different rotation velocities (e.g., rotation at opposite direction). While some embodiments of system 10 are described below with a particular emphasis to configuration (i) wherein the tray is a rotary tray that is configured to rotate about vertical axis 14 relative to heads 16, it is to be understood that the present application contemplates also configurations (ii) and (iii) for system 10. Any one of the embodiments of system 10 described herein can be adjusted to be applicable to any of configurations (ii) and (iii), and one of ordinary skills in the art, provided with the details described herein, would know how to make such adjustment.

In the following description, a direction parallel to tray 12 and pointing outwardly from axis 14 is referred to as the radial direction r, a direction parallel to tray 12 and perpendicular to the radial direction r is referred to herein as the azimuthal direction φ, and a direction perpendicular to tray 12 is referred to herein is the vertical direction z.

The radial direction r in system 10 enacts the indexing direction y in system 110, and the azimuthal direction φ enacts the scanning direction x in system 110. Therefore, the radial direction is interchangeably referred to herein as the indexing direction, and the azimuthal direction is interchangeably referred to herein as the scanning direction.

The term "radial position," as used herein, refers to a position on or above tray 12 at a specific distance from axis 14. When the term is used in connection to a printing head, the term refers to a position of the head which is at specific distance from axis 14. When the term is used in connection to a point on tray 12, the term corresponds to any point that belongs to a locus of points that is a circle whose radius is the specific distance from axis 14 and whose center is at axis 14.

The term "azimuthal position," as used herein, refers to a position on or above tray 12 at a specific azimuthal angle relative to a predetermined reference point. Thus, radial position refers to any point that belongs to a locus of points that is a straight line forming the specific azimuthal angle relative to the reference point.

The term "vertical position," as used herein, refers to a position over a plane that intersect the vertical axis 14 at a specific point.

Tray 12 serves as a building platform for three-dimensional printing. The working area on which one or objects are printed is typically, but not necessarily, smaller than the total area of tray 12. In some embodiments of the present invention the working area is annular. The working area is shown at 26. In some embodiments of the present invention tray 12 rotates continuously in the same direction throughout the formation of object, and in some embodiments of the present invention tray reverses the direction of rotation at least once (e.g., in an oscillatory manner) during the formation of the object. Tray 12 is optionally and preferably removable. Removing tray 12 can be for maintenance of system 10, or, if desired, for replacing the tray before printing a new object. In some embodiments of the present invention system 10 is provided with one or more different replacement trays (e.g., a kit of replacement trays), wherein two or more trays are designated for different types of objects (e.g., different weights) different operation modes (e.g., different rotation speeds), etc. The replacement of tray 12 can be manual or automatic, as desired. When automatic replacement is employed, system 10 comprises a tray replacement device 36 configured for removing tray 12 from its position below heads 16 and replacing it by a replacement tray (not shown). In the representative illustration of FIG. 1B tray replacement device 36 is illustrated as a drive 38 with a movable arm 40 configured to pull tray 12, but other types of tray replacement devices are also contemplated.

Exemplified embodiments for the printing head 16 are illustrated in FIGS. 2A-2C. These embodiments can be employed for any of the AM systems described above, including, without limitation, system 110 and system 10.

FIGS. 2A-B illustrate a printing head 16 with one (FIG. 2A) and two (FIG. 2B) nozzle arrays 22. The nozzles in the array are preferably aligned linearly, along a straight line. In embodiments in which a particular printing head has two or more linear nozzle arrays, the nozzle arrays are optionally and preferably can be parallel to each other. When a printing head has two or more arrays of nozzles (e.g., FIG. 2B) all arrays of the head can be fed with the same building material, or at least two arrays of the same head can be fed with different building materials.

When a system similar to system 110 is employed, all printing heads 16 are optionally and preferably oriented along the indexing direction with their positions along the scanning direction being offset to one another.

When a system similar to system 10 is employed, all printing heads 16 are optionally and preferably oriented radially (parallel to the radial direction) with their azimuthal positions being offset to one another. Thus, in these embodiments, the nozzle arrays of different printing heads are not parallel to each other but are rather at an angle to each other, which angle being approximately equal to the azimuthal offset between the respective heads. For example, one head can be oriented radially and positioned at azimuthal position $φ_1$, and another head can be oriented radially and positioned at azimuthal position $φ_2$. In this example, the azimuthal offset between the two heads is $φ_1$-$φ_2$, and the angle between the linear nozzle arrays of the two heads is also $φ_1$-$φ_2$.

In some embodiments, two or more printing heads can be assembled to a block of printing heads, in which case the printing heads of the block are typically parallel to each other. A block including several inkjet printing heads 16a, 16b, 16c is illustrated in FIG. 2C.

In some embodiments, system 10 comprises a stabilizing structure 30 positioned below heads 16 such that tray 12 is between stabilizing structure 30 and heads 16. Stabilizing structure 30 may serve for preventing or reducing vibrations of tray 12 that may occur while inkjet printing heads 16 operate. In configurations in which printing heads 16 rotate about axis 14, stabilizing structure 30 preferably also rotates such that stabilizing structure 30 is always directly below heads 16 (with tray 12 between heads 16 and tray 12).

Tray 12 and/or printing heads 16 is optionally and preferably configured to move along the vertical direction z, parallel to vertical axis 14 so as to vary the vertical distance between tray 12 and printing heads 16. In configurations in which the vertical distance is varied by moving tray 12 along the vertical direction, stabilizing structure 30 preferably also moves vertically together with tray 12. In configurations in which the vertical distance is varied by heads 16 along the vertical direction, while maintaining the vertical position of tray 12 fixed, stabilizing structure 30 is also maintained at a fixed vertical position.

The vertical motion can be established by a vertical drive 28. Once a layer is completed, the vertical distance between tray 12 and heads 16 can be increased (e.g., tray 12 is lowered relative to heads 16) by a predetermined vertical step, according to the desired thickness of the layer subsequently to be printed. The procedure is repeated to form a three-dimensional object in a layerwise manner.

The operation of inkjet printing heads 16 and optionally and preferably also of one or more other components of system 10, e.g., the motion of tray 12, are controlled by a controller 20. The controller can have an electronic circuit and a non-volatile memory medium readable by the circuit, wherein the memory medium stores program instructions which, when read by the circuit, cause the circuit to perform control operations as further detailed below.

Controller 20 can also communicate with a host computer 24 which transmits digital data pertaining to fabrication instructions based on computer object data, e.g., in a form of a Standard Tessellation Language (STL) or a StereoLithography Contour (SLC) format, Virtual Reality Modeling Language (VRML), Additive Manufacturing File (AMF) format, Drawing Exchange Format (DXF), Polygon File Format (PLY) or any other format suitable for Computer-Aided Design (CAD). The object data formats are typically structured according to a Cartesian system of coordinates. In these cases, computer 24 preferably executes a procedure for transforming the coordinates of each slice in the computer object data from a Cartesian system of coordinates into a polar system of coordinates. Computer 24 optionally and preferably transmits the fabrication instructions in terms of the transformed system of coordinates. Alternatively, computer 24 can transmit the fabrication instructions in terms of the original system of coordinates as provided by the computer object data, in which case the transformation of coordinates is executed by the circuit of controller 20.

Figure 3A:
FIGS. 3A and 3B are schematic illustrations demonstrating coordinate transformations according to some embodiments of the present invention.
Figure 3B:
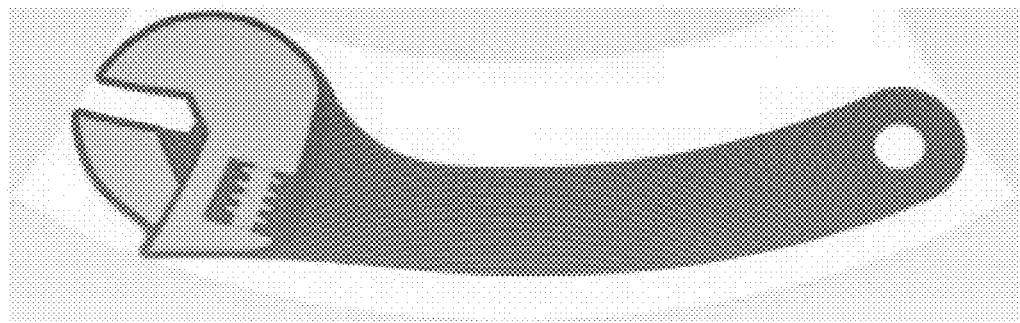

The transformation of coordinates allows three-dimensional printing over a rotating tray. In non-rotary systems with a stationary tray with the printing heads typically reciprocally move above the stationary tray along straight lines. In such systems, the printing resolution is the same at any point over the tray, provided the dispensing rates of the heads are uniform. In system 10, unlike non-rotary systems, not all the nozzles of the head points cover the same distance over tray 12 during at the same time. The transformation of coordinates is optionally and preferably executed so as to ensure equal amounts of excess material at different radial positions. Representative examples of coordinate transformations according to some embodiments of the present invention are provided in FIGS. 3A-B, showing three slices of an object (each slice corresponds to fabrication instructions of a different layer of the objects), where FIG. 3A illustrates a slice in a Cartesian system of coordinates and FIG. 3B illustrates the same slice following an application of a transformation of coordinates procedure to the respective slice.

Typically, controller 20 controls the voltage applied to the respective component of the system 10 based on the fabrication instructions and based on the stored program instructions as described below.

Generally, controller 20 controls printing heads 16 to dispense, during the rotation of tray 12, droplets of building material in layers, such as to print a three-dimensional object on tray 12.

System 10 optionally and preferably comprises one or more solidifying devices 18, which can include, for example, one or more radiation sources, such as, but not limited to, an ultraviolet or visible or infrared lamp, or other sources of electromagnetic radiation, or electron beam source, depending on the modeling material being used. Radiation source can include any type of radiation emitting device, including, without limitation, light emitting diode (LED), digital light processing (DLP) system, resistive lamp and the like. Radiation source 18 serves for curing or solidifying the modeling material. In various exemplary embodiments of the invention the operation of solidifying device 18 is controlled by controller 20 which may activate and deactivate solidifying device 18 and may optionally also control the amount of radiation generated by solidifying device 18.

In some embodiments of the invention, system 10 further comprises one or more leveling devices 32 which can be manufactured as a roller or a blade. Leveling device 32 serves to straighten the newly formed layer prior to the formation of the successive layer thereon. In some embodiments, leveling device 32 has the shape of a conical roller positioned such that its symmetry axis 34 is tilted relative to the surface of tray 12 and its surface is parallel to the surface of the tray. This embodiment is illustrated in the side view of system 10 (FIG. 1C).

The conical roller can have the shape of a cone or a conical frustum.

The opening angle of the conical roller is preferably selected such that there is a constant ratio between the radius of the cone at any location along its axis 34 and the distance between that location and axis 14. This embodiment allows roller 32 to efficiently level the layers, since while the roller rotates, any point p on the surface of the roller has a linear velocity which is proportional (e.g., the same) to the linear velocity of the tray at a point vertically beneath point p. In some embodiments, the roller has a shape of a conical frustum having a height h, a radius $R_1$ at its closest distance from axis 14, and a radius $R_2$ at its farthest distance from axis 14, wherein the parameters h, $R_1$ and $R_2$ satisfy the relation $R_1/R_2=(R-h)/h$ and wherein R is the farthest distance of the roller from axis 14 (for example, R can be the radius of tray 12).

The operation of leveling device 32 is optionally and preferably controlled by controller 20 which may activate and deactivate leveling device 32 and may optionally also control its position along a vertical direction (parallel to axis 14) and/or a radial direction (parallel to tray 12 and pointing toward or away from axis 14.

In some embodiments of the present invention printing heads 16 are configured to reciprocally move relative to tray along the radial direction r. These embodiments are useful when the lengths of the nozzle arrays 22 of heads 16 are shorter than the width along the radial direction of the working area 26 on tray 12. The motion of heads 16 along the radial direction is optionally and preferably controlled by controller 20.

Figure 1E:
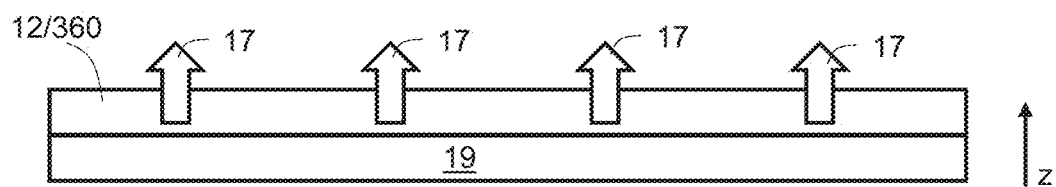
FIGS. 1E-G are schematic illustrations of a work tray for an additive manufacturing system in embodiments of the invention in which the work tray comprises or is associated with a radiation source.
Figure 1F:
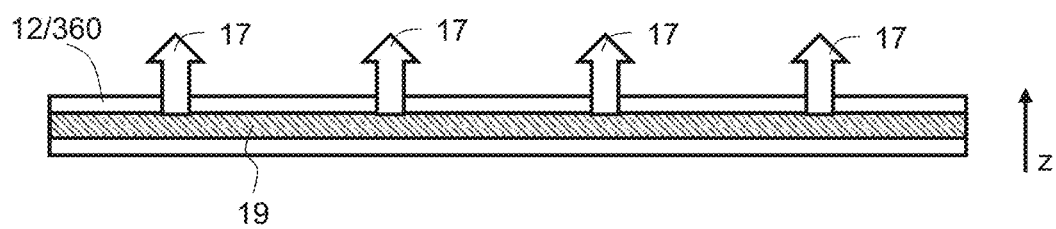
Figure 1G:
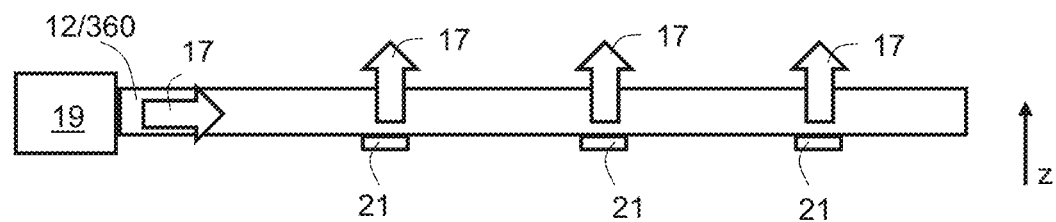

FIGS. 1E-G are schematic illustrations of work tray 12/360 in embodiments of the invention in which the work tray comprises or is associated with a radiation source 19 that emits radiation 17 to irradiate the building material from below. Radiation source 19 can emit any type of radiation 17, including, without limitation, electromagnetic radiation (e.g., ultraviolet, visible, infrared, etc.), electron beam radiation, or the like, depending on the modeling material being used. The radiation 17 emitted by Radiation source 19 serves for solidifying the building material from below. Radiation source 19 can comprise any device capable of emitting radiation 17, such as, but not limited to, one or more LEDs, a digital light projector (DLP), a laser device, electron beam source, or the like. Radiation source 19 can be controlled by controller 20 which may activate and deactivate it and may optionally also control the amount and/or cross sectional area of radiation 17.

In the schematic illustration of FIG. 1E, radiation source 19 is below the work tray, in which case work tray 12/360 is preferably transparent to the radiation 17 emitted by source 19. In the schematic illustration of FIG. 1F, radiation source 19 is embedded within tray 12/360, in which case the parts of the work tray that are above source 19 are transparent to radiation 17. In the schematic illustration of FIG. 1G, radiation source 19 is mounted at the side of tray 12/360, in which case radiation 17 is coupled into tray 12/360 and guided within tray 12/360 until it exits upwards. Radiation 17 can be guided by the material of work tray 12/360 (e.g., by means of total internal reflection) and exit upwards by redirection elements 21 (e.g., mirrors or diffraction gratings). Radiation 17 can be guided by one or more waveguides (not shown) embedded in the work tray 12/360.

In some embodiments, radiation source 19 is activated by controller 20 only when the bottommost layer(s) of building materials are dispensed (e.g., the first 1, 2, 3, 4 or 5 layers), and deactivated thereafter. Alternatively, the building material dispensed to form the bottommost layers can be transparent to radiation 17, to allow radiation 17 to penetrate through the bottommost layers and solidify the layers above them. Some embodiments contemplate selecting for the bottommost layer(s) building materials that absorb radiation 17, so as to mask the layers above them from radiation 17.

In some embodiments, radiation source 19 is activated in a spatially-selective manner, wherein some regions over the tray emit radiations and other regions do not emit radiation. For example, radiation source 19 is activated in a spatially-selective manner, only regions on the work tray above which the building material has been dispensed irradiate. Spatially-selective irradiation can be achieved, for example, by providing radiation source 19 as a LED array, and activating the individual LEDs selectively.

Some embodiments contemplate the fabrication of an object by dispensing different materials from different arrays of nozzles (belonging to the same or different printing head). These embodiments provide, inter alia, the ability to select materials from a given number of materials and define desired combinations of the selected materials and their properties. According to the present embodiments, the spatial locations of the deposition of each material with the layer is defined, either to effect occupation of different three-dimensional spatial locations by different materials, or to effect occupation of substantially the same three-dimensional location or adjacent three-dimensional locations by two or more different materials so as to allow post deposition spatial combination of the materials within the layer, thereby to form a composite material at the respective location or locations.

Any post deposition combination or mix of modeling materials is contemplated. For example, once a certain material is dispensed it may preserve its original properties. However, when it is dispensed simultaneously with another modeling material or other dispensed materials which are dispensed at the same or nearby locations, a composite material having a different property or properties to the dispensed materials may be formed.

In some embodiments of the present invention the system dispenses digital material for at least one of the layers.

The phrase "digital materials", as used herein and in the art, describes a combination of two or more materials on a pixel level or voxel level such that pixels or voxels of different materials are interlaced with one another over a region. Such digital materials may exhibit new properties that are affected by the selection of types of materials and/or the ratio and relative spatial distribution of two or more materials.

As used herein, a "voxel" of a layer refers to a physical three-dimensional elementary volume within the layer that corresponds to a single pixel of a bitmap describing the layer. The size of a voxel is approximately the size of a region that is formed by a building material, once the building material is dispensed at a location corresponding to the respective pixel, leveled, and solidified.

The present embodiments thus enable the deposition of a broad range of material combinations, and the fabrication of an object which may consist of multiple different combinations of materials, in different parts of the object, according to the properties desired to characterize each part of the object.

Further details on the principles and operations of an AM system suitable for the present embodiments are found in U.S. Published Application No. 20100191360, the contents of which are hereby incorporated by reference.

In some embodiments of the present invention system 10 and/or system 110 are configured for printing one or more objects on a fabric.

As used herein "fabric" encompasses any article of manufacture that is made at least partially of a natural or man-made fibrous material. Examples of types of fabric include, but are not limited to: clothes, shoes, toys, fabric articles, carpets, cloth hats, cloth bags, socks, towels, draperies, etc.

The present embodiments contemplate printing on woven or non-woven fabrics.

As used herein, "woven" means a structure produced when at least two sets of strands are interlaced, e.g., at right angles to each other, according to a predetermined pattern of interlacing, and such that at least one set is parallel to the axis along the lengthwise direction of the fabric, in accordance with ASTM D123-03.

As used herein, the term "nonwoven" means a textile structure produced by bonding or interlocking of fibers, or both, accomplished by mechanical, chemical, thermal, or solvent means and combinations in accordance with ASTM D123-03.

Preferably, but not necessarily, when the printing system (e.g., system 10 or 110) is employed for printing an object on a fabric, leveling device 32 is not used. In these embodiments, each layer of building material that is dispensed on the fabric is solidified (e.g., cured) after dispensing and without leveling the layer.

Preferably, but not necessarily, when the printing system (e.g., system 10 or 110) is employed for printing an object on a fabric the height of the printed objects is below 10 cm, more preferably below 9 cm, more preferably below 8 cm, more preferably below 8 cm, more preferably below 7 cm, more preferably below 6 cm, more preferably below 5 cm, more preferably below 4 cm, more preferably below 3 cm, more preferably below 2 cm, more preferably below 1 cm.

In some embodiments of the present invention the work tray of the system (e.g., tray 12 or 360) has reflectivity of at least 50% or at least 60% or at least 70% or at least 80% or more to radiation emitted by the radiation source of solidifying device 18. The advantage of making the work tray reflective or partially reflective is that the reflected radiation arriving to the fabric from below can solidify building material that is below the fabric and can also penetrate the pores of the fabric and solidify droplets of building material within these pores, thereby improving the adherence of the printed object to the fabric.

The present embodiments also contemplate providing the work tray with one or more fluid channels 52. A fluid delivery system 54 can generates a flow of fluid within fluid channel 52. The fluid is optionally and preferably can be at a controlled temperature, thereby controlling the temperature of the work tray. When fluid delivery system 54 generates a flow of fluid that is at a temperature that is less than the temperature of the dispensed building material, the fluid absorbs heat from the building material. Fluid delivery system 54 can also generate a flow of fluid that is at an elevated temperature relative to the fabric, facilitating straightening wrinkles in the fabric before dispensing the building materials on the fabric. The present inventors also contemplate combination of these embodiments, wherein the fluid is at an elevated temperature before dispensing the building materials and at a reduced temperature during the fabrication of the object. The fluid can be in a gaseous or liquid phase (e.g., air, helium, water, oil or the like). Preferably, fluid delivery system 54 is controlled by controller 20.

In some embodiments of the present invention system 10 and/or 110 comprise a jig 402 configured for affixing a fabric 420 to a predetermined location on the work tray of the system (e.g., tray 12 or 360), and also at a predetermined orientation relative to the nozzle arrays (e.g., arrays 122) of the system. In some embodiments of the present invention jig 402 is also configured for stretching fabric 420.

Figure 4A:
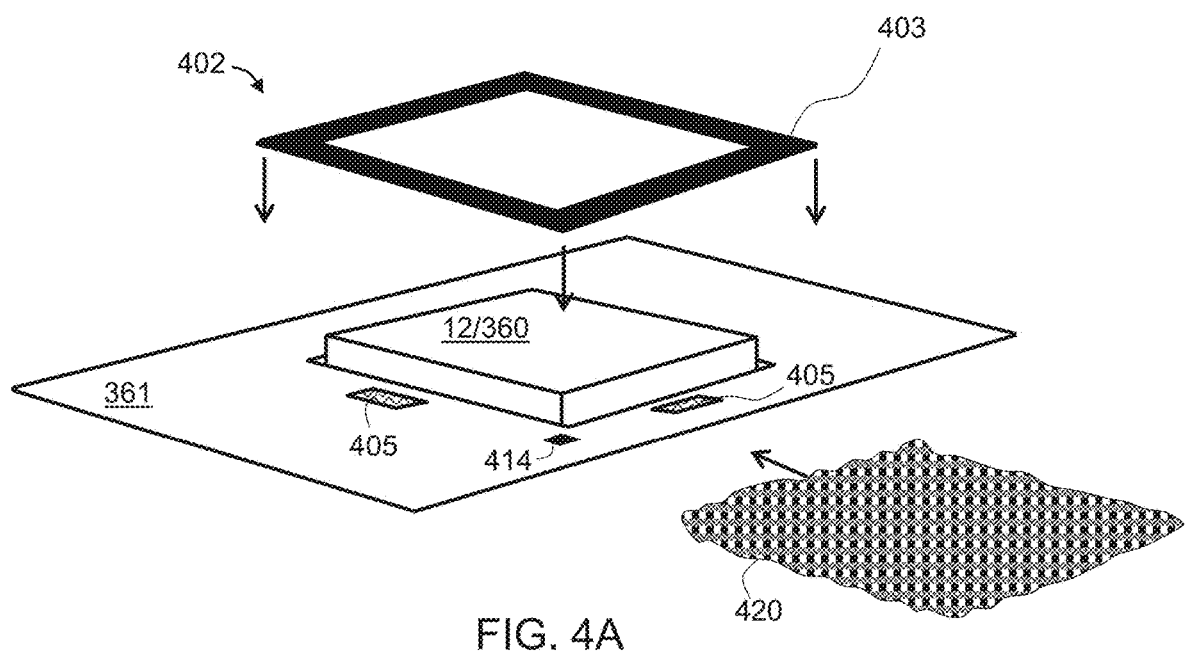
FIGS. 4A-F are schematic illustrations of a jig suitable for some embodiments of the present invention.
Figure 4B:
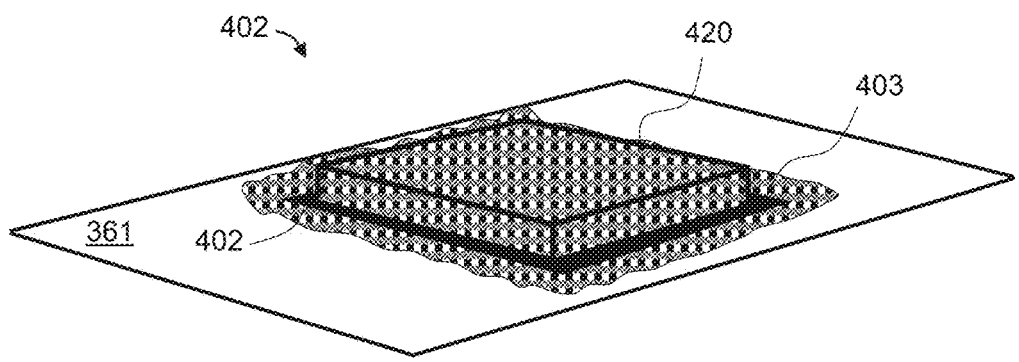

Jig 402 is illustrated in greater detail in FIGS. 4A-F. FIGS. 4A and 4B illustrate an embodiment in which jig 402 comprises a frame 403 and one or more magnetic or metallic elements 405, wherein elements 405 are attached, preferably permanently, to tray 360/12 or adjacent thereto, e.g., onto a static platform 361 surrounding tray 360/12, and wherein at least one of tray 360/12 and elements 405 comprises a permanent magnet to ensure mutual magnetic attraction between elements 405 and frame 403. Frame 403 can be made magnetic or metallic in its entirety, or it can include metallic or magnetic elements (not shown, see FIGS. 4E and 4F) on its periphery, at lateral locations that match the locations of elements 405. FIG. 4A illustrates jig 402 in its opened state, before fabric 420 is placed on the work tray 360/12, and FIG. 4B illustrates jig 402 in its closed state wherein frame 403 is magnetically attached to elements 405 (not shown in FIG. 4B), affixing and optionally and preferably stretching fabric 420 onto work tray 360/12. Jig 402 can also comprise a pair of frames 403 magnetically attachable to each other, in which case the fabric 420 is stretched between the frames of jig 402 before it is placed on work tray 360/12. In these embodiments, elements 405 are not necessary.

Figure 4C:
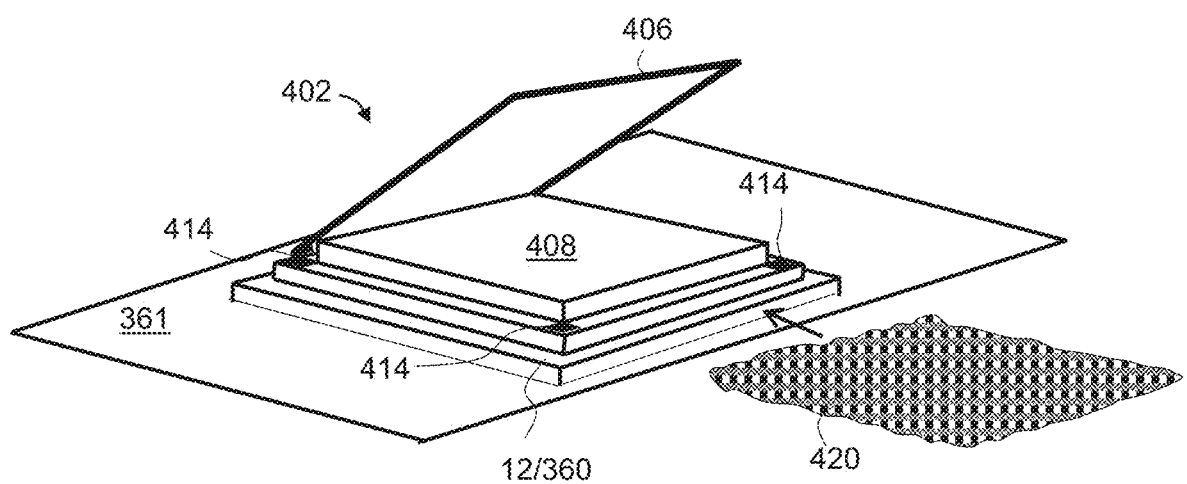
Figure 4D:
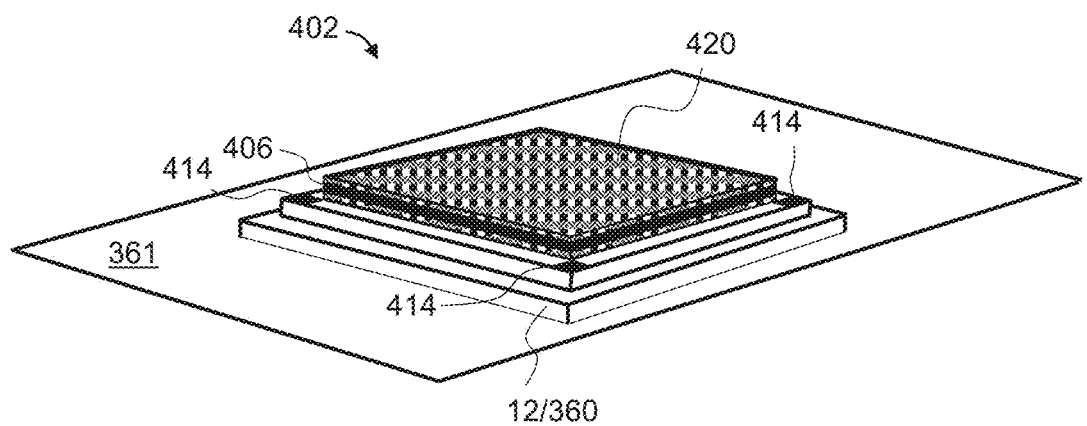
Figure 4E:
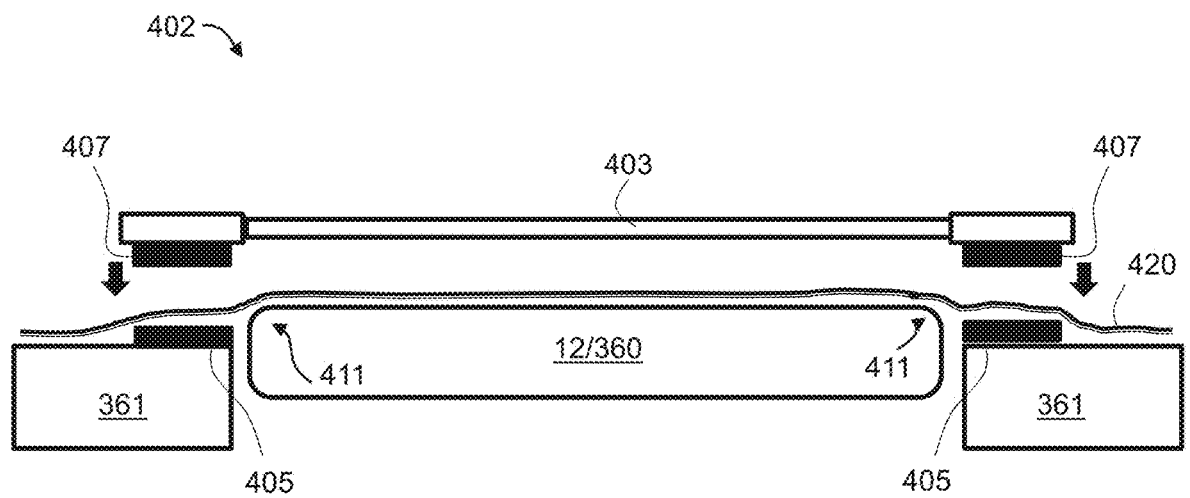
Figure 4F:
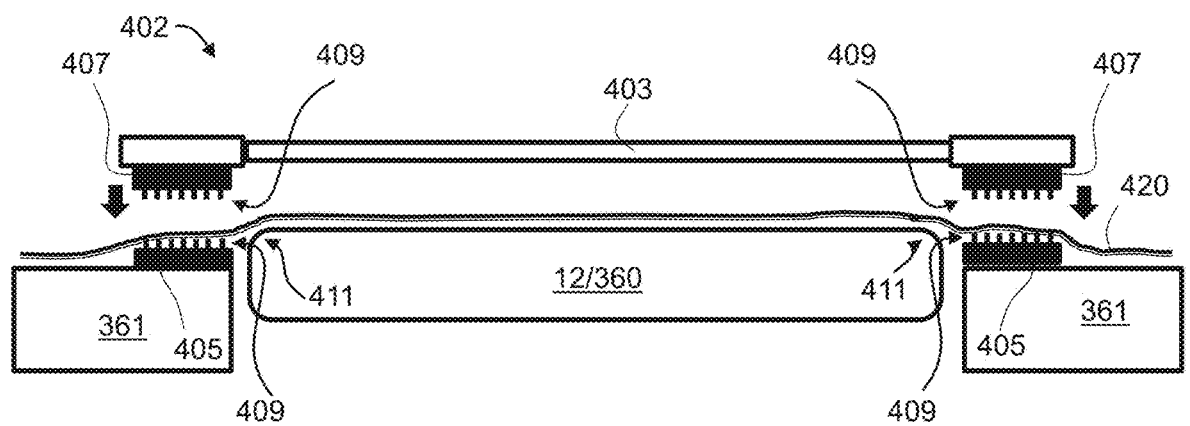

FIGS. 4E and 4F illustrate a side view of jig 402. In the illustrated embodiment, frame 403 is provided with magnetic or metallic elements 407 mounted on its periphery, at lateral locations that match the locations of elements 405. Elements 407 and 405 can be flat, as illustrated in FIG. 4E, or they can comprise protruding elements 409 or a rough surface, as illustrated in FIG. 4F. The protruding elements or rough surface can be on the metallic or magnetic elements mounted on frame 403, on platform 361, or on both frame 403 and platform 361. When frame 403 is metallic or magnetic in its entirety, and there are no additional metallic or magnetic elements 407 mounted thereon, the protruding elements 409 or a rough surface can be formed on frame 403 at lateral locations that match the locations of elements 405.

FIGS. 4C and 4D illustrate an embodiment in which jig 402 comprises a rotatable frame 406 and a planar fabric holder 408 wherein frame 406 is sized and shaped such that once frame 406 is rotated to engage the plane of fabric holder 408, frame 406 surrounds fabric holder 408 and traps fabric 420 between frame 406 and fabric holder 408. Fabric holder 408 can be in the form of a continuous surface or a frame. When fabric holder 408 is a continuous surface, fabric 420, once placed and optionally and preferably stretched on fabric holder 408, can be accessed only from one side of fabric 420 (typically from above). When fabric holder 408 is shaped as a frame, fabric 420, once placed and optionally and preferably stretched on fabric holder 408, can be accessed from both sides of fabric 420. FIG. 4C illustrates jig 402 in its opened state, ready to receive fabric 420, and FIG. 4D illustrates jig 402 in its closed state affixing fabric 420 to tray 12/360.

Figure 5A:
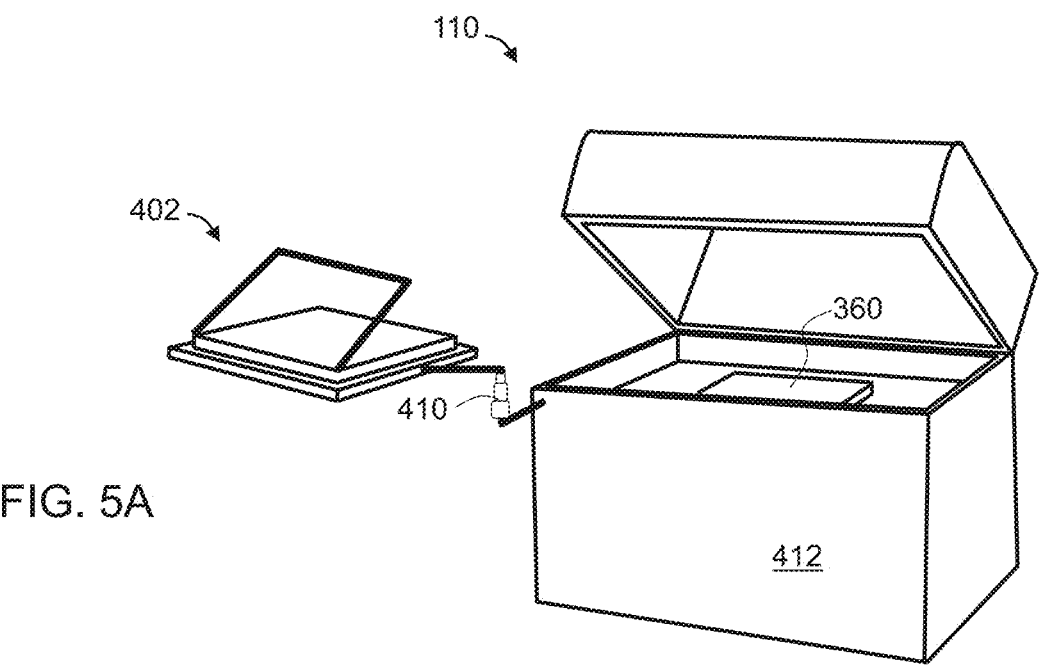
FIGS. 5A and 5B are schematic illustrations of a robotic mechanism connected to a printing chamber or an enclosure of a system for three-dimensional printing, according to some embodiments of the present invention.
Figure 5B:
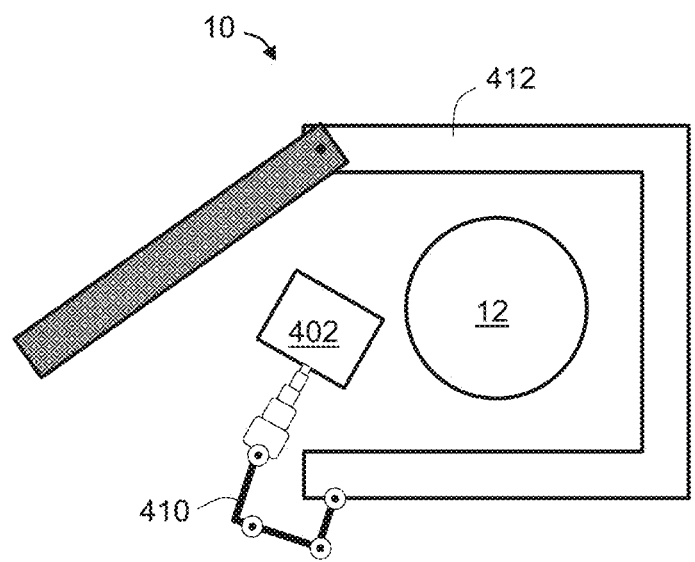
Figure 5C:
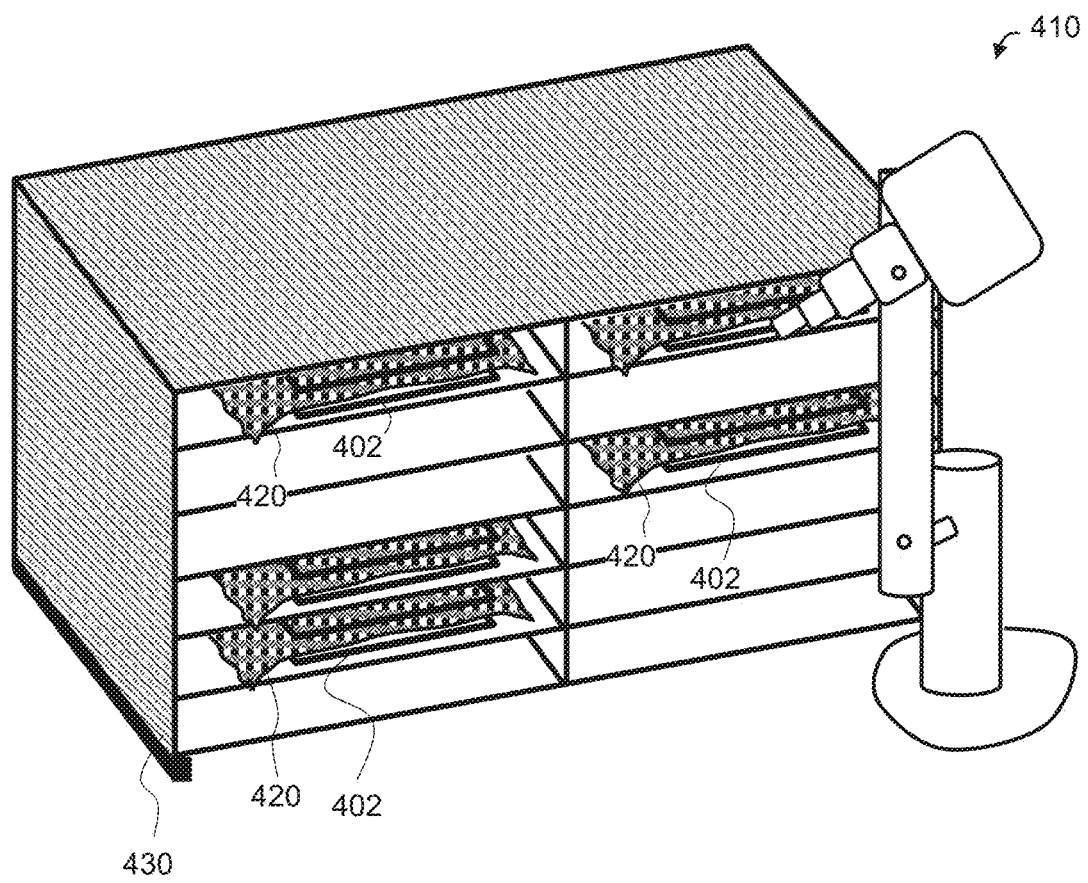
FIG. 5C is a schematic illustration of a depository of jigs being accessed by a robotic mechanism, according to some embodiments of the present invention.

The advantage of having a jig which also comprises planar fabric holder 408 is that it allows jig 402 to receive fabric 420 either while jig 402 is placed on work tray 12/360 (as illustrated in FIGS. 4C and 4D), or before jig 402 is placed on work tray 12/360 (as illustrated in FIGS. 5A-C described below.

Figure 15A:
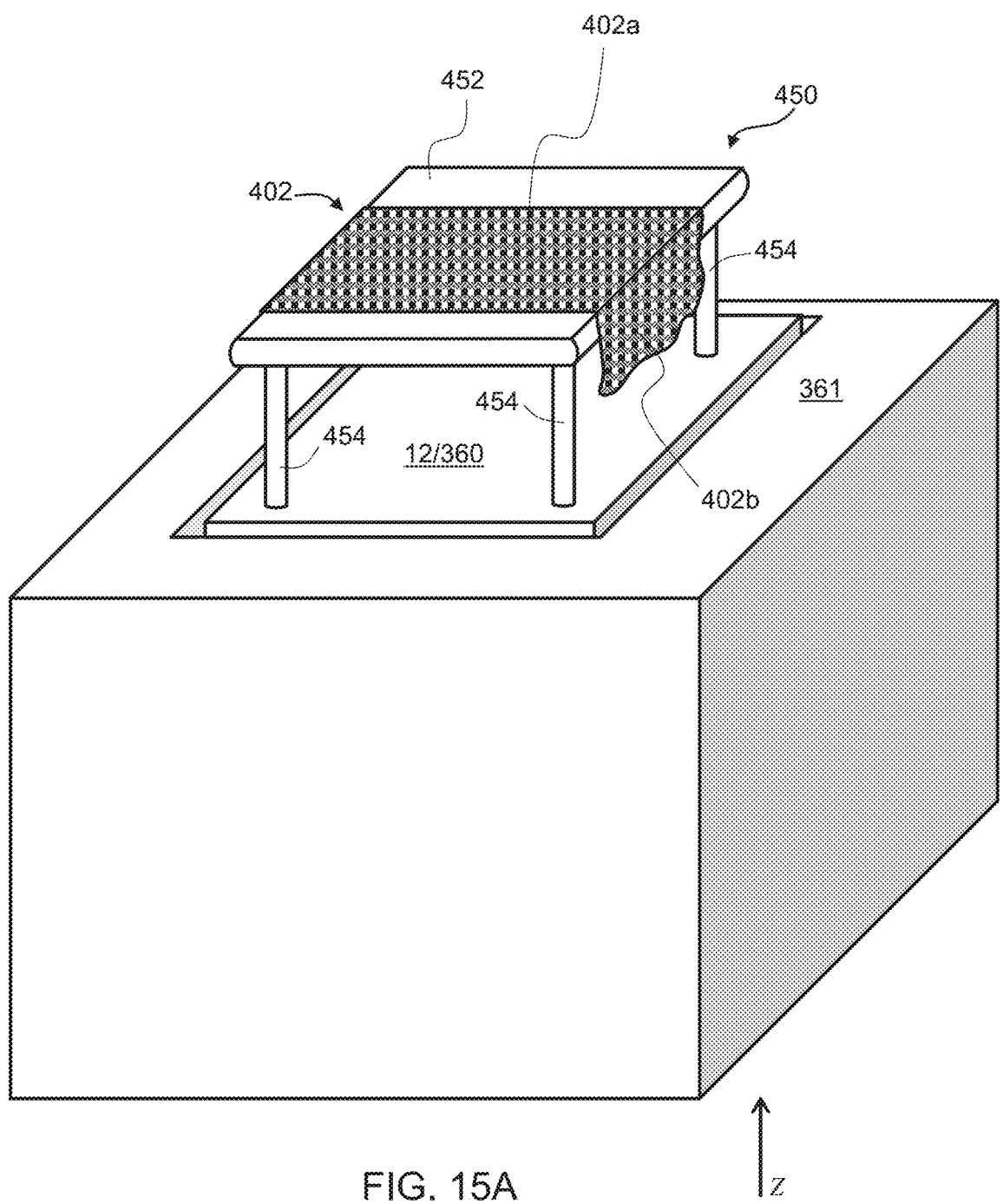
FIGS. 15A-C are schematic illustrations of a configuration in which a fabric is placed on a ramp structure, according to some embodiments of the present invention.
Figure 15B:
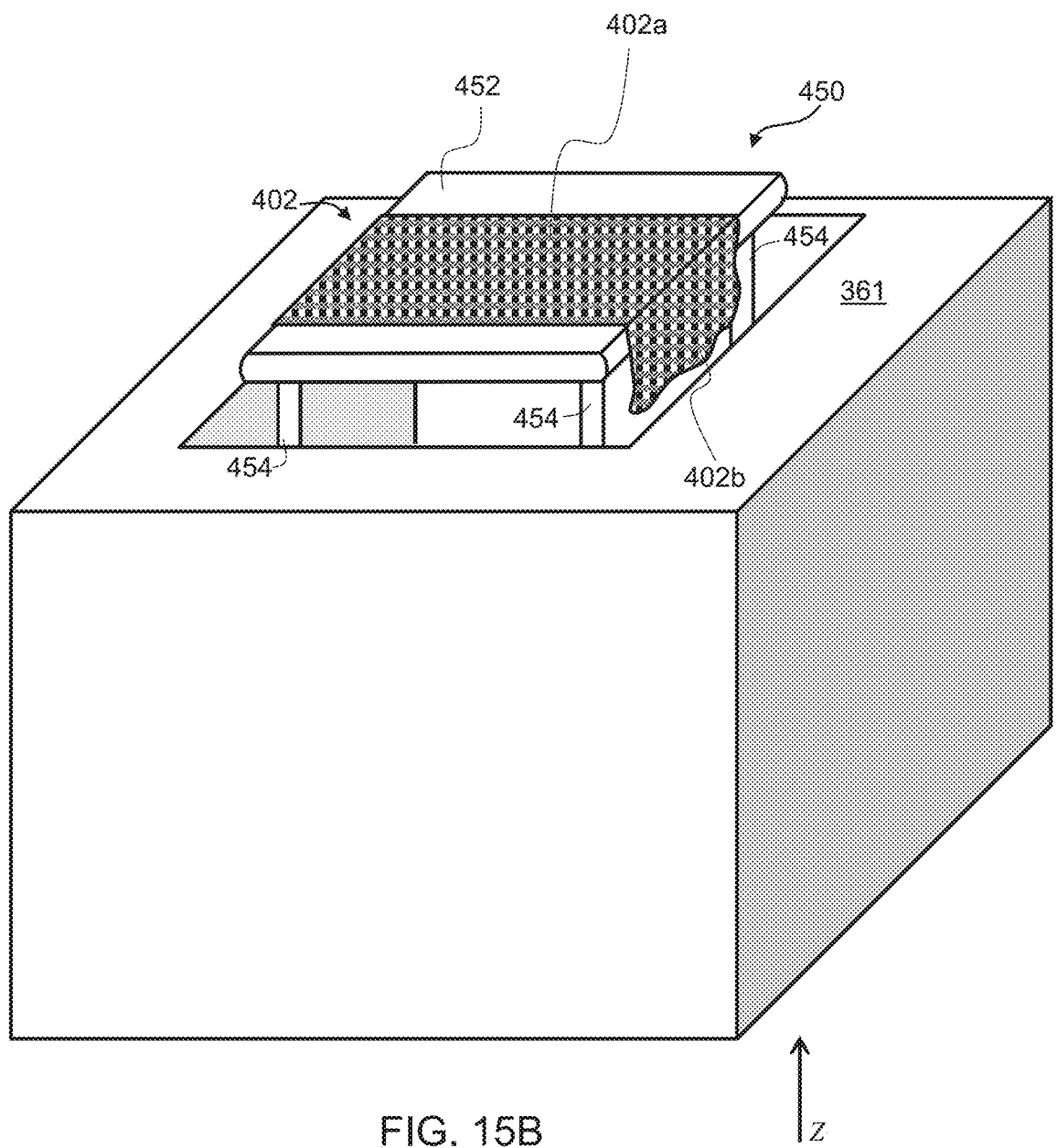
Figure 15C:
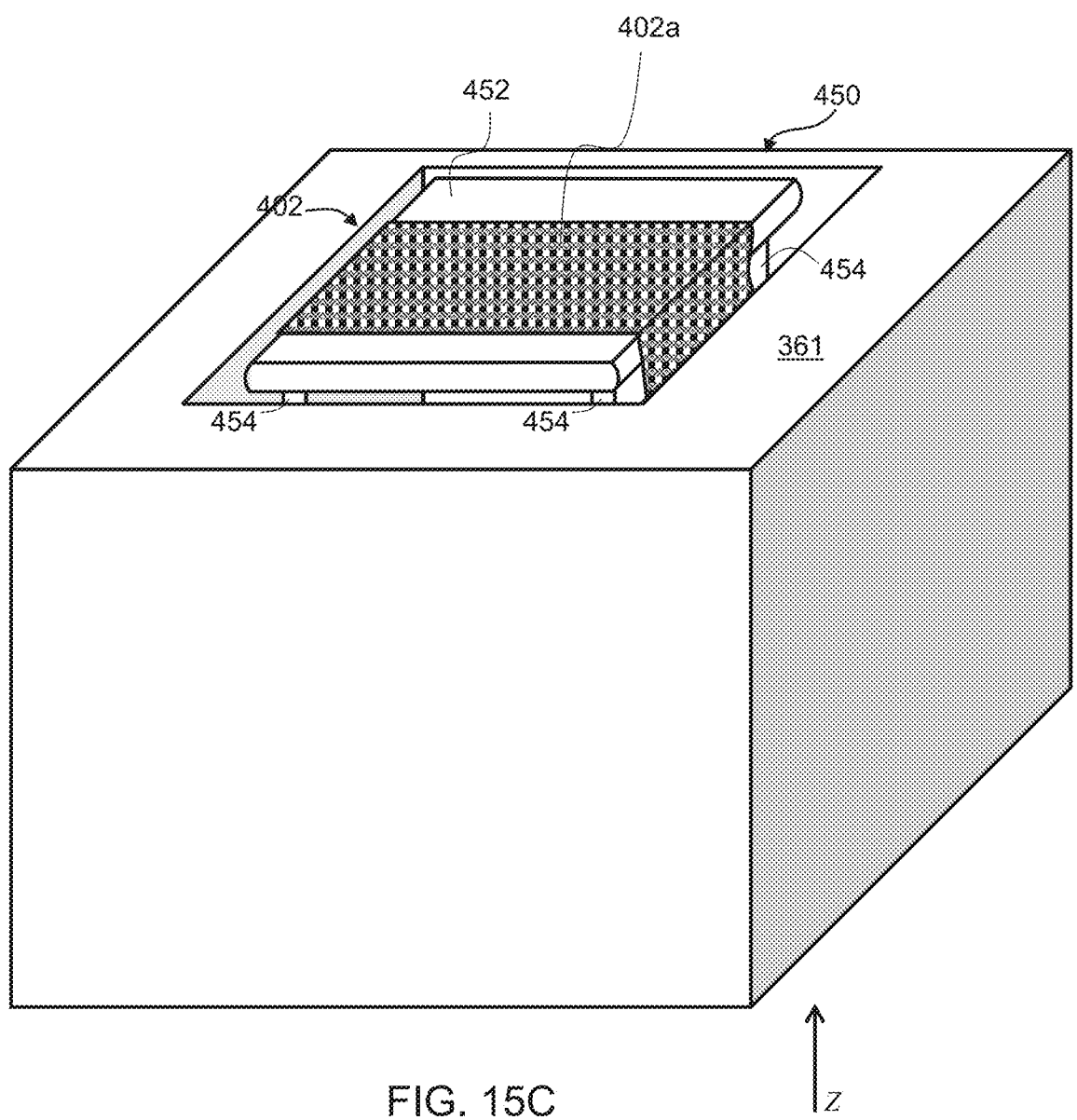
Figure 16:
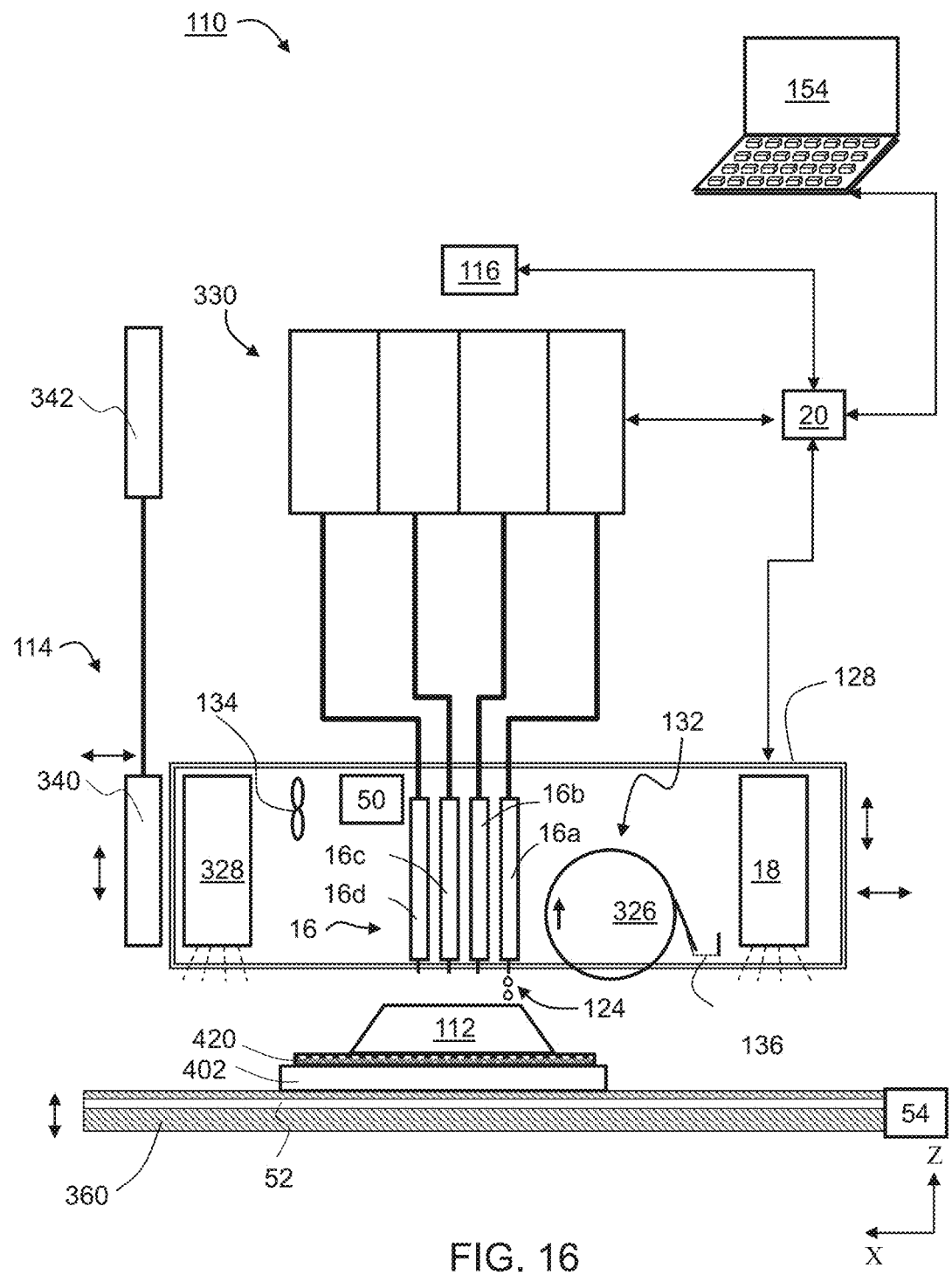
FIG. 16 is a schematic illustration of the additive manufacturing system shown in FIG. 1A, in which the nozzle array and the additive dispensing system are configured to move independently.

FIGS. 15A-C are schematic illustrations of a configuration in which fabric 420 is placed on a ramp structure 450 which includes a planar ramp 452 and one or more spacer beams 454 keeping ramp 452 spaced apart vertically from the work tray 12/360. Ramp structure 450 can be placed on tray 12/360, or connected to the tray 12/360 by connectors (not shown), such as, but not limited to, snap connectors. When ramp structure 450 is connected to the tray, the connectors are preferably outside the printing area of the AM system, so as not to interfere with the printing process when the AM system is operated without ramp 450. Fabric 420 can be affixed using any of the techniques described above except that the fabric is affixed to ramp structure 450 rather than to tray 12/360.

The advantage of using ramp structure 450 is that it allows printing a three-dimensional object on a fabric that is larger than the work tray. In use, fabric 420 is affixed to the upper surface of ramp 452. When the size of fabric 420 is larger than the size of ramp structure, fabric 420 is folded over the edge of ramp structure 450, so that a horizontal portion 420*a* of fabric 420 is supported by the upper surface of ramp 452 and a hanging portion 420*b* of fabric 420 is folded into a space below ramp 452 but above work tray 12/360, as illustrated in FIG. 15A. Preferably, fabric 420 is affixed to ramp structure 450 before placing on work tray 12/360 or connecting it thereto, but embodiments in which fabric 420 is affixed to ramp 452, while ramp structure 450 is on work tray 12/360, are also contemplated.

Once fabric 420 is affixed to work tray 12/360 (FIGS. 4A-F) or ramp 452 (FIG. 15A-C), the computerized controller 20 (FIGS. 1A and 1B) operates the array(s) of nozzles 122 (FIGS. 2A-C) to dispense building material(s) in a configured pattern corresponding to a shape of an object on the affixed fabric 420. In embodiments in which ramp structure 450 is employed the computerized controller 20 controls the array(s) of nozzles 122 to terminate any dispensing when the nozzles are above the gap between ramp structure 450 and platform 361, thereby ensuring that the droplets of building material(s) land only on the horizontal portion 402*a* of fabric 420.

It is appreciated that when ramp structure 450 is employed, the vertical position of ramp 452 along the Z direction is higher than that of work tray 12/360. In this case, the computerized controller 20 adjusts the vertical position of work tray 12/360 so as to compensate for the height of ramp structure 452 above work tray work tray 12/360. The adjustment process is illustrated in FIGS. 15A-C. The initial vertical position of work tray 12/360 is preferably selected such that the upper surface of ramp 452 is at the vertical position that work tray 12/360 would have had, had ramp structure not have been employed. For example, as illustrated in FIG. 15C, the initial vertical position of work tray 12/360 can be selected such that the upper surface of ramp 452 is at the same vertical position as the upper surface of platform 361. Once the initial vertical position is adjusted the printing process continues in layers as further detailed hereinabove, wherein once the layer is completed, work tray 12/360 is lowered in the Z direction, according to the desired thickness of the subsequent layer.

In some embodiments of the present invention system 10/110 comprises a robotic mechanism 410 (e.g., a multi-axis robotic arm, a gantry robot, and the like) connected to jig 402 and configured for placing jig 402 on tray 360 or 12. For example, robotic mechanism 410 can be connected at its distant end to jig 402 and proximal end to a printing chamber or an enclosure of the printing system 110 or 10. FIGS. 5A and 5B illustrate the printing chamber or an enclosure 412 of system 110 (FIG. 5A) and system 10 (FIG. 5B), connected to the proximal end of robotic mechanism 410.

Preferably, computerized controller 20 also controls robotic mechanism 410. Controller 20 can control robotic mechanism 410 to introduce jig 402 into the printing chamber or enclosure 412 and place it onto tray 12 or 360 before dispensing the building material(s) on fabric 420, and optionally and preferably also remove it from the printing chamber or enclosure 412 following the formation of the object or a portion thereof, based on a preprogramed three-dimensional printing protocol. Preferred three-dimensional printing protocols are described hereinunder. The advantage of using a computerized controller for controlling robotic mechanism 410 is that it allows accurate placement of jig 402 at a predetermined location on work tray 12 or 360, and also at a predetermined orientation relative to the arrays 122 of nozzles.

Robotic mechanism 410 can grip jig 402 by any griping technique known in the art, such as, but not limited to, by means of gripper jaws, suction, magnetic attachment, or the like.

In some embodiments of the present invention robotic mechanism 410 is controlled by controller 20 to access a depository of jigs, grip and withdraw one jig from the depository, and place the withdrawn jig on the work tray. These embodiments are schematically illustrated in FIG. 5C, showing a depository 430 of a plurality of jigs 402, accessible by robotic mechanism 410. In the illustration of FIG. 5C, which is not to be considered as limiting, depository 430 is in the form of a static rack, but other types of static or movable depositories (e.g., a rotatable wheel, a convey, etc.) are also contemplated. Preferably, one or more of the jigs 402, more preferably each of the jigs 402 in the depository 430, holds and optionally and preferably stretches a fabric portion 420. In these embodiments, when robotic mechanism 410 grips one of the jigs 402 of depository 430, it withdraws the respective jig while the fabric portion is held by the jig, and places the jig, together with the stretched fabric, on the work tray (not shown, see, e.g., FIGS. 5A and 5B).

In some embodiments of the present invention robotic mechanism 410 is configured for flipping the orientation of jig 402 with respect to a horizontal plane (e.g., the plane engaged by tray 12 or 360), optionally and preferably in response to a signal received from controller 20. These embodiments are particularly useful when fabric holder 408 is shaped as a frame, since they allow a sequence of printing operations in which objects can be printed on both sides of fabric 420. For example, the fabric can be stretched on jig 402, and an object can be printed on one side of the fabric. Then, while the fabric is still stretched thereon, jig 402 is flipped and an object can be printed on the opposite side of the fabric.

The present embodiments also contemplate printing on both sides of the fabric without flipping jig 402. In these embodiments, the arrays 122 of nozzles, and optionally also the solidifying device 18, are operated, typically by the controller 20, to form an object on the tray or some receiving surface placed on the tray. Thereafter, robotic mechanism 410 introduces jig 402 holding the fabric and optionally and preferably stretching it into the printing chamber or enclosure 412, and onto the previously formed object, such that one side of the fabric contacts the object. The arrays 122 of nozzles and optionally also the solidifying device 18 are then operated again to form another object on the opposite side of the fabric.

When two-sided printing is employed, in any of the above embodiments, objects printed on different sides of the fabric can have different properties and functions. For example, when the fabric is intended to be a part of a clothing, objects having desired aesthetic properties or providing the clothing with a desired appearance (e.g., lenticular, prismatic, or hidden or fluorescent objects, or objects having selective optical reflectivity, or waveguide, etc.) are printed on the outer side of the fabric, and objects having desired function (e.g., objects having a pharmaceutical agent, or a cosmetic agent, or a heating element, or a cooling element, etc.) are printed on the inner side of the fabric.

Figure 6A:
FIGS. 6A-E are schematic illustrations of a sequence of operations suitable for a two-sided printing method for anchoring an object to a fabric, according to some embodiments of the present invention.

Two-sided printing is also useful for ensuring that the printed object is secured to the fabric. This will now be explained, with reference to FIGS. 6A-E, which are schematic illustrations of a sequence of operations suitable for a two-sided printing method according to some embodiments of the present invention. The method optionally and preferably prints, using array(s) 122, a pedestal structure 502 on a receiving surface, such as, but not limited to, work tray 12 or 360 (FIG. 6A). Pedestal 502 optionally and preferably serves to ease the removal of printed objects from the printing tray and thus may help prevent deformation by manual or mechanical damage. Pedestal 502 can also improve the object's accuracy in the Z direction (height), and/or may improve an object's accuracy in the X-Y directions. Pedestal 502 is sacrificial, and therefore preferably comprises a support material. Preferably the support formulation is soluble in liquid, e.g., in water. In various exemplary embodiments of the invention pedestal 502 comprises a combination of support and modeling materials.

Figure 6B:
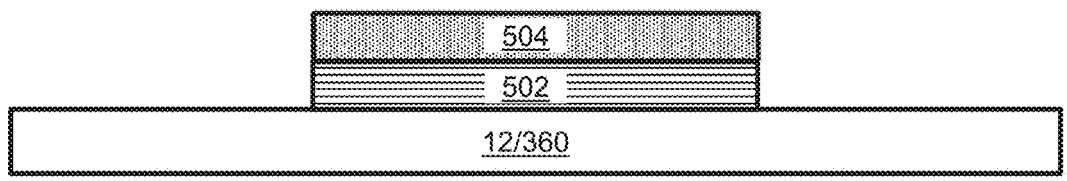

The method also prints a securing element 504 on a receiving surface (FIG. 6B). When a pedestal structure 502 is formed, securing element 504 is preferably printed on pedestal structure 502. Otherwise, securing element 504 can be printed on another receiving surface, such as, but not limited to, work tray 12 or 360. Unlike pedestal structure 502, securing element 504 is preferably not sacrificial and is therefore made, at least in part, of a modeling material, optionally and preferably a non-soluble modeling material. Preferably, the building material(s) used to form the securing elements 504 are generally transparent to visible light (e.g., having transmittance to visible light of at least 50%, e.g., from about 50% to about 99%, or from about 55% to about 95%).

The lateral dimension of securing element 504 is preferably approximately the same as the lateral dimension of the object to be printed, but the present embodiments also contemplate securing elements 504 which are larger or smaller than the object to be printed along at least one lateral dimension (the indexing and/or scanning directions). The advantage of printing a securing element 504 with lateral dimensions that are approximately the same or smaller than the lateral dimension of the object to be printed, is that such a configuration saves on the amount of material to be used, is economical from the standpoint of the total weight of the final product, and is also efficient from the standpoint of printing time.

Figure 6C:
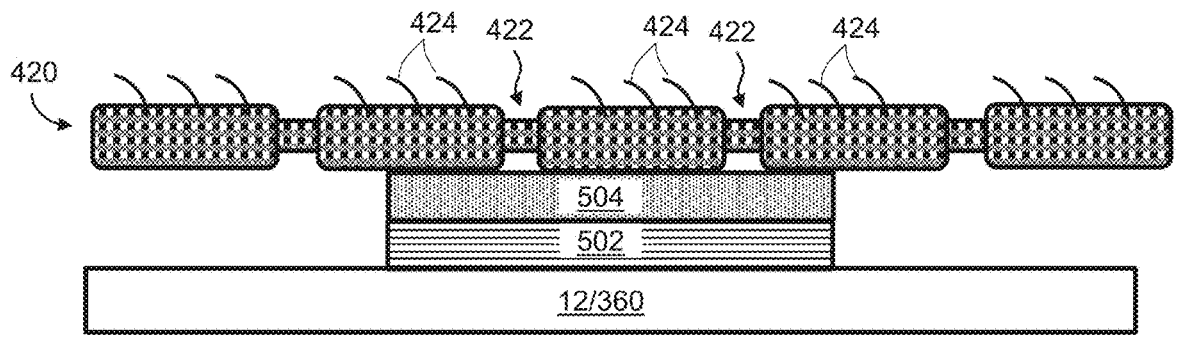
Figure 6D:
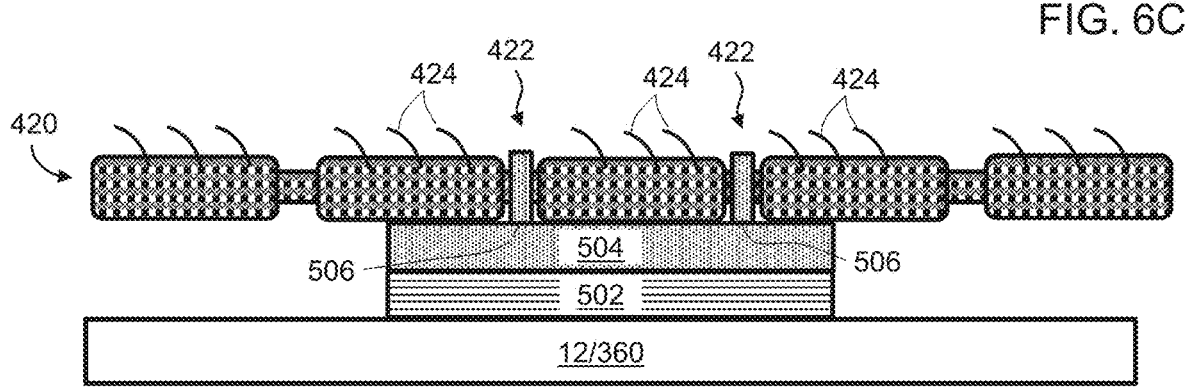

Following the printing of securing element 504, fabric 420 is placed on securing element 504, as illustrated in FIG. 6C. Shown in FIG. 6C is an enlarged view of a portion of fabric 420 showing pores 422 between the fibers that form the fabric, and also protruding fuzz fibers 424. The fabric 420 can be placed on securing element 504 while being stretched on jig 402 (not shown in FIGS. 6A-D). The advantage of using jig 402 is that the stretching widens pores 422 making the connection between the printed object to the fabric more robust. The placement of fabric 420 on securing element 504 can be by activating robotic mechanism 410. The method then dispenses building material on fabric 420 to form one or more penetration elements 506 penetrating through pores 422 of fabric 420 and being connected to securing element 504 beneath fabric 420 (FIG. 6C). Penetration elements 506 are preferably made, at least in part, from modeling material. Preferably, the building material(s) used to form the securing elements 504 are generally transparent to visible light.

Penetration of elements 506 through pores 422 is optionally and preferably ensured by judicious control of the time period Δt between the time at which building material that forms elements 506 is dispensed and the time at which solidifying device 18 solidifies it. Specifically, the time period Δt is selected to be sufficiently long to ensure that element 506 contacts element 504 while the building material forming element 506 is still in its liquid state.

Control over the period Δt can be done in more than one way. In some embodiments of the present invention the solidifying device 18 is deactivated for a delay time selected to ensure that the time period between the time at which elements 506 are dispensed and the time at which they are solidified is Δt. For example, when system 110 is employed, block 128 can be brought to rest, e.g., at a position outside tray 360, and when system 10 is employed solidifying device 18 can be deactivated while allowing tray 10 to rotate.

An additional control over the time Δt is by providing two solidifying devices at both sides of the heads 16, and activating the solidifying devices based on the direction of relative motion between the heads and the tray. Specifically, a higher value of Δt can be achieved by activating the solidifying device that arrives at elements 506 before the head (so that a return trip is completed before element 506 is irradiated), and a lower value of Δt can be achieved by activating the solidifying device that arrives at elements 506 after the head (so that less than a return trip is completed before element 506 is irradiated).

In some embodiments of the present invention the speed of relative motion between the tray and the solidifying device 18 is selected to ensure that the time period between the time at which elements 506 are dispensed and the time at which they are solidified is Δt. This can be done throughout the print job, or, more preferably, only during the formation of elements 506. For example, the method can reduce the speed of the relative motion immediately before or after the dispensing of the building materials that form elements 506, and increase the speed after elements 506 are solidified.

Figure 6E:
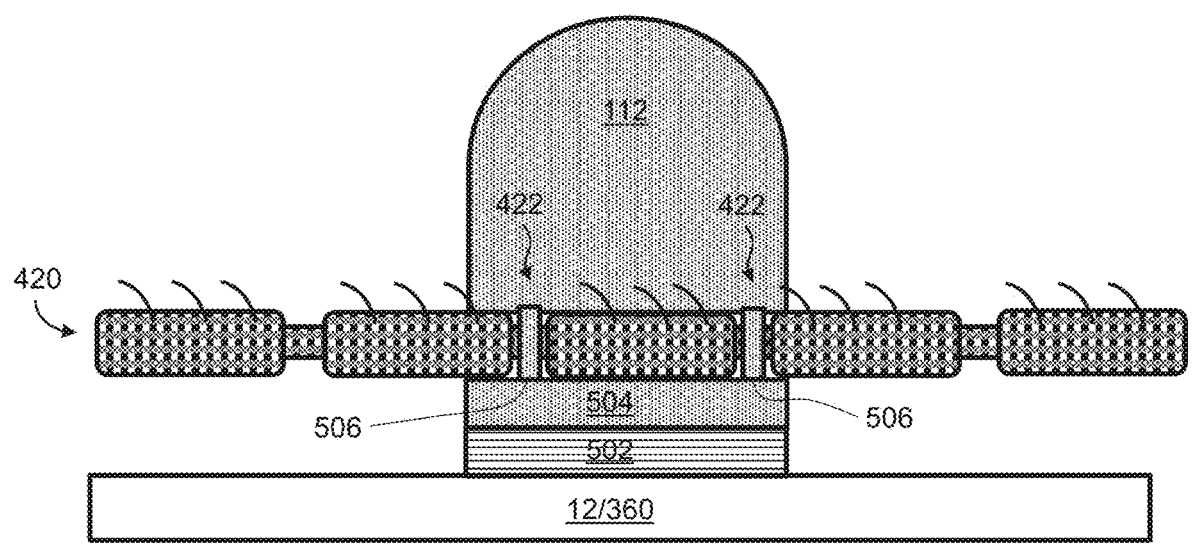

Once elements 506 are dispensed and solidified, the method dispenses building material(s) on the fabric 420 and on the penetration elements 506 in a configured pattern corresponding to a shape of a predesigned object 112 (FIG. 6E).

It is to be understood that the printing sequence illustrated in FIGS. 6A-E can be modified and still provide an object on one side of the fabric, a securing element on the other side of the fabric, and one or more penetration elements penetrating through the pores of the fabric and connecting the object with the securing element. One of ordinary skills in the art, provided with the details described herein would know how to adjust the described printing sequence to his or hers needs.

Figure 7:
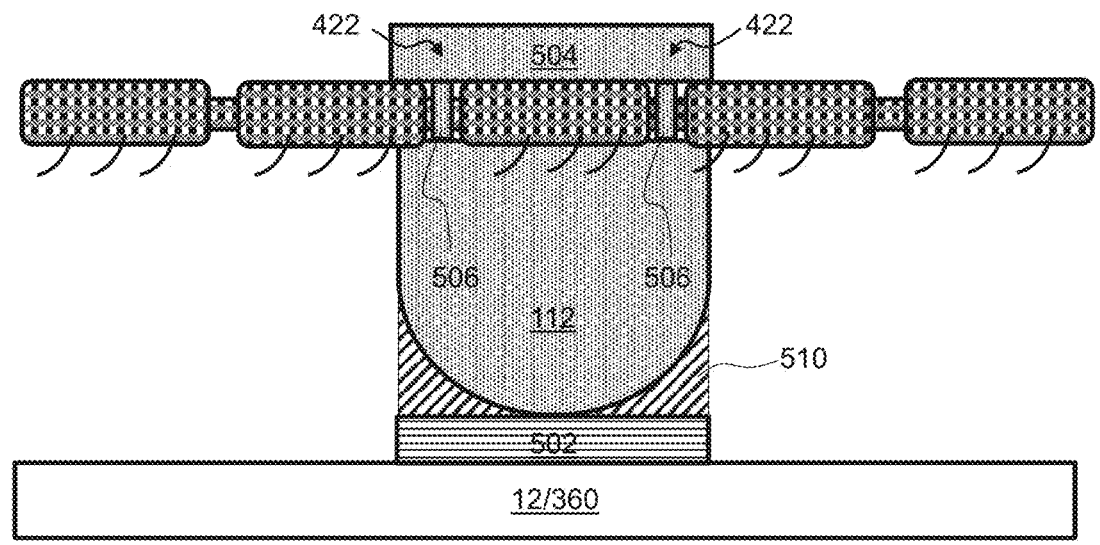
FIG. 7 is a schematic illustration of an object that is printed upside down and is anchored to a fabric by two-sided printing, according to some embodiments of the present invention.

A representative example of such a modification is illustrated in FIG. 7. In this example, selected operations illustrated in FIGS. 6A-E are reversed. The object 112 is printed upside down on the tray or, more preferably, on the pedestal structure 502, and the fabric 420 is placed on the printed object 112, preferably while being stretched on jig 402. The placement of fabric 420 on object 112 can be by activating robotic mechanism 410. The penetration elements 506 are printed onto fabric 420 and are allowed to penetrate through the pores 422 to connect with object 112. Thereafter, securing element 504 is printed onto fabric 420 to connect to penetration elements 506. FIG. 7 also illustrates a support structure 510 which is preferably made, at least in part, of support material and which serves for supporting hanging parts or thin walls of object 112 during the fabrication process as known in the art of three-dimensional printing. While support structure 510 is shown only in FIG. 7, it is to be understood that use of support structure 510 during the fabrication of object 112 is contemplated also when object 112 is not printed upside down (e.g., during the sequence of operations shown in FIGS. 6A-E), and that support structures such as structure 510 can be printed at any stage of the fabrication of object 112.

The advantage of the embodiments illustrated in FIG. 7 is that they can be utilized in a manner that most of the object's height is fabricated on the tray before placing the fabric thereon. This allows fabrication of relatively higher objects (e.g., more than 10 cm, or more than 12 cm, or more than 14 cm, or more than 16 cm, or more than 18 cm, or more than 20 cm in thickness.

Figure 8A:
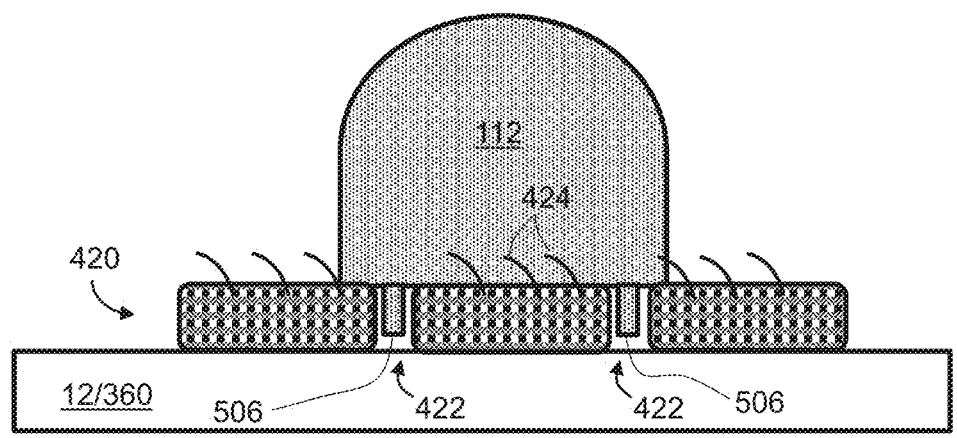
FIGS. 8A and 8B are schematic illustrations of a printed object that is anchored to a fabric without executing a two-sided printing, according to some embodiments of the present invention.
Figure 8B:
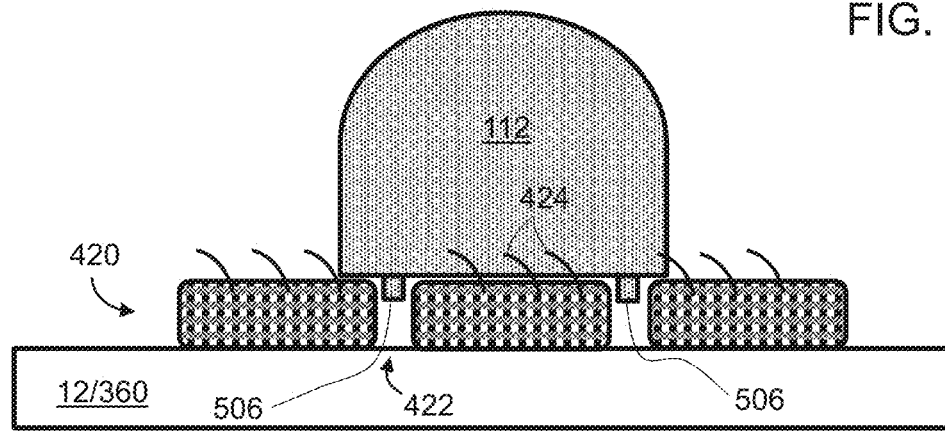

The present embodiments also contemplate use of penetration elements 506 for anchoring the printed object to the fabric 420 without executing a two-sided printing. These embodiments are illustrated in FIGS. 8A and 8B. FIG. 8A illustrates an embodiment in which penetration elements 506 penetrate deep into pores 422, but do not reach the other side of fabric 420 (e.g., penetration into about 50-80% of the depth of the pores), and FIG. 8B illustrates an embodiment in which penetration elements 506 only slightly penetrate into pores 422 (e.g., penetration into less than 50% of the depth of the pores, e.g. 10-40%). The inventors found that such anchoring is sufficient, in particular in fabrics with a large density of protruding fuzz fibers 424, which tend to adhere to the building materials of object 112, hence further strengthening the bonding between object 112 and fabric 420.

With reference to FIGS. 1A-C, system 10 and 110 optionally and preferably comprises a position tracking system 50. In some embodiments of the present invention position tracking system 50 is configured for determining a position of jig 402 relative to work tray 12 or 360, once jig 402 is placed on the tray. Position tracking system 50 can include, for example, an optical scanner, an imaging device, a magnetic sensor, and/or a radiofrequency sensor. Computerized controller 20 receives position tracking signals from system 50 and executes a registration procedure based on the position tracking signals, and operates nozzle array 122 responsively to the registration. The advantage of this embodiment is that it does not require accurate positioning of jig 402 on the tray, since the registration procedure performed by controller 20 ensures that the nozzles are activated to dispense the building materials at the appropriate locations on fabric 420.

Position tracking system 50 can determine the position of jig 402 in more than one way. In some embodiments of the present invention, system 50 captures an image of the tray or a portion thereof (e.g., when system 50 comprises a pixelated imager or an optical scanner) and executes an image processing procedure to identify the location of jig 402 relative to the tray. In some embodiments of the present invention position tracking system 50 can determine the position of jig 402 using marks 414, which can be formed or attached, for example, to the frame 406 of jig 402, or, as illustrated in FIGS. 4A, 4C and 4D, on fabric holder 408, or, on the work tray, or, as illustrated in FIG. 4A on static platform 361. The marks 414 are identifiable by position tracking system 50 and are used by system 50 for determining the position of jig 402. For example, when system 50 comprises an optical scanner or an imager, marks 414 can be a printed pattern, such as, but not limited to, a barcode, or a source of optical signal, e.g., a light emitting diode emitting radiation that does not solidify the building materials dispensed by the nozzle arrays. When system 50 comprises a magnetic or radiofrequency sensor, marks can comprise a source of radiofrequency or magnetic field, such as, but not limited to, a miniature coil or the like.

The present disclosure also contemplates embodiments in which position tracking system 50 is used to identify patterns (e.g., printed patterns, weaving pattern, knitted pattern) on fabric 420 itself. In these embodiments, it is not necessary for tracking system 50 to be used for determining the position of the jig 402 (although such determination is also contemplated in some embodiments) since controller 20 can execute the registration procedure based on the identified patterns on fabric 420.

The fabrication process of three-dimensional objects on fabric 420 may optionally and preferably include use of one or more liquid additives other than a building material for three-dimensional printing. Such liquid additives may include, but are not limited to, a priming solution (e.g., a stiffening solution, an adhesive solution, a pore size modifying solution, etc.), a finishing solution (e.g., a radiation protective solution, a glossy finish solution, a matte finish solution, etc.), a masking solution, and the like. Other types of additive that can be used according to some embodiments of the present invention include temporary protection solutions, water repellent solutions, waterproof solutions, hydrophobic solutions, and the like.

When the additive is a priming solution, it is applied prior to the dispensing of the building material. Thus, for example, an adhesive solution can be applied to the fabric and then a building material can be dispensed wherein the adhesive solution ensures adherence of the building material to the fabric. Another example is the application of a pore size modifying solution that increases the sizes of the pores of the fabric. A building material can then be dispensed to form a penetration element (e.g., element 506) within the increased pores. An additional example is the application of a stiffening substance so as to stabilize the fabric prior to the dispensing.

When the additive is a finishing solution, it is applied after the dispensing of the building material(s). For example, a glossy or matte finish solution can be applied on the dispensed building material(s) to impart the dispensed materials with a desired appearance. Similarly, a paint such as a metallic paint (e.g. chrome, gold) can be applied in the form of a finishing solution on at least part of the object that has been printed with the building material. Also contemplated are finishing solutions that serve for protecting the fabric or printed object, for example, against discoloration, radiation, abrasion, chemical damages, water absorption, and the like. Representative examples of such protective solutions, include, without limitation, UV resistant material (such as the UV resistant material commercially available from Krylon®), polyurethane (such as the polyurethane solution available from Rust-Oleum).

When the additive is a masking solution, it is preferably applied prior to the dispensing of the building material. The masking solution serves for preventing selected regions of the fabric from contacting the dispensed building material(s), and is therefore executed selectively at locations not to be occupied by the object to be printed. The masking solution is preferably removable, e.g., washable. For example, a masking solution can include the solution disclosed in U.S. Pat. No. 5,308,647, the contents of which are hereby incorporated by reference. The masking solution can also be applied after printing, but before finishing (if applied), so as to protect the object or other locations on the fabric from the finishing solution (if applied).

Also contemplated is the use of layers of support material as a protective coating, in locations not to be occupied by the object to be printed.

Any of the aforementioned additives can optionally and preferably comprise a non-active formulation capable of being activated in situ, namely while being spread on the fabric. In these embodiments, the formulation is applied to the fabric and activated thereafter. The activation may, for example, induce polymerization of monomers and/or oligomers, or cross-linking of polymeric chains, or modification of optical properties of the formulation. The present embodiments contemplate many types of non-active formulation capable of being activated in situ. In some embodiments of the present invention the activation is by radiation, e.g., optical radiation, for example, ultraviolet or infrared radiation, and in some embodiments the activation is by heat.

Also contemplated are formulations that are activated by chemical reaction. Such reaction can occur between the formulation and one or more of the building materials, and/or between two or more applied formulations. For example, in some embodiments of the present invention one or more building materials are dispensed onto the fabric and are allowed to at least partially penetrate into the pores of the fibers while being in their liquid phase. Thereafter, a formulation that reacts with the dispensed building materials is applied. The chemical reaction between the building materials and the applied formulation modifies at least one property of the building materials (e.g., mechanical and/or optical property). In some embodiments, the formulation induces polymerization in the dispensed building materials.

In embodiments in which two or more formulations react with each other, they are preferably deposited separately such as to induce reaction between them on the fabric. Depending on the product of such a reaction, the formulations can be deposited before the dispensing of the building material(s), after the dispensing of the building material(s), or contemporaneously or intermittently with the dispensing of the building material(s).

For example, the formulations can be deposited before the dispensing of the building material(s), when the reaction product forms an adhesive allowing adherence of the building material(s), and/or when the reaction product modifies the pore size (e.g., a reaction product that locally shrinks the fibers of the fabric, thereby increasing the inter-fiber pore size), and/or when the reaction product that forms a mask on regions of the fabric which are desired to be protected from being contacted with building materials. The formulations can be deposited after the dispensing of the building material(s), when the reaction product modifies the appearance of the building material(s) (e.g., increases or reduces glossiness, modifies color), or to cover the building material(s) with a (typically transparent) cover, e.g., a protective cover. The formulations can be deposited contemporaneously or intermittently with the dispensing of the building material(s), when it is desired to interlace the reaction product vertically or laterally with the building material(s), e.g., to reinforce the building materials, improve the flexibility of the final object, etc.

The additive(s) can be applied in more than one way. Typically, an additive dispensing system 340 is employed (FIGS. 1A and 1B). The additive dispensing system 340 is typically in fluid communication with a container 342 containing the additive (shown only in FIG. 1A). Additive dispensing system 340 can be controlled by the controller 20. In some embodiments of the present invention, one or more additives is applied by directing an aerosol or mist of the additive to the fabric. In these embodiments, the system 340 is in the form of an aerosol dispenser or a sprinkler for generating the aerosol or mist of the additive and directing it to the fabric. In some embodiments of the present invention, one or more additives is applied by depositing droplets of the additive at discrete addressable locations on the fabric. In these embodiments, one or more of the printing heads 16 can enact the system 340 and can be configured to dispense the respective additive, and one or more of the containers or cartridges of supply system 330 can enact the container 342. When there are two or more additives (e.g., formulations that are otherwise non-reactive but react with each other in situ after deposition), the depositing at discrete addressable locations on the fabric can be done in an interlaced manner, preferably laterally, to form interfaces between adjacent drops of different additives.

Additive dispensing system 340 can be mounted on the same printing block with heads 16, as illustrated in FIG. 1A, and therefore move horizontally together with heads 16. Alternatively, system 340 can be mounted separately from heads 16 (see, e.g., FIG. 1B), in which case heads 16 and system 340 can be configured to move independently. In some embodiments, building tray 12/360 or a section thereof moves under a static additive dispensing system 340 (e.g. a row of sprinklers) and/or a static printing block 128 on which heads 16 are mounted. In some other embodiments, tray 360 is configured to move in the Z direction, heads 16 are mounted in printing block 128 which is configured to perform horizontal scans of the surface of tray 360 in a first direction (e.g. X axis), and additive dispensing system 340 is configured to perform horizontal scans of the surface of tray 360 in a second direction (e.g. Y axis). In some embodiments, both printing block 128 and additive dispensing system 340 are configured to perform horizontal scans of the surface of tray 360 in the same direction (e.g. X axis).

The present disclosure also contemplates use of a non-liquid additive. For example, the applied additive can be in solid phase. In these embodiments, the additive can be applied by contacting the fabric with a substrate carrying the additive and applying pressure, radiation and/or heat to the substrate so as to transfer the additive from the substrate to the fabric. The substrate is typically, but not necessarily, in the form of a film containing the additive or coated with the additive. For example, when the additive comprises a stiffening substance, such as, but not limited to, an oily substance, e.g., wax, a sheet containing the stiffening substance can be placed on the fabric and the sheet can be heated and/or pressed agenized the fabric such that the stiffening substance is transferred to the fabric.

The solid phase additive can be applied on the same side of the fabric on which the building materials are dispensed, and/or on an opposite side of the fabric on which said building materials are dispensed. Application of solid phase additive to the fabric is typically executed prior to the dispensing, but embodiments in which the solid phase additive is applied to the fabric after the object is formed thereon are also contemplated.

The contact between the substrate carrying the additive and the fabric can be either by placing the substrate on the fabric (e.g., outside the printing chamber 412) or by placing the fabric on the substrate, for example, the substrate can be placed on the tray 12 or 360 of the system or the jig 402, and the fabric can be placed on the substrate. When the substrate is placed on the tray or the jig, the tray or jig are optionally and preferably heated after the fabric is placed on the substrate so as to induce a transfer of the solid phase additive from the substrate to the fabric.

Figure 9:
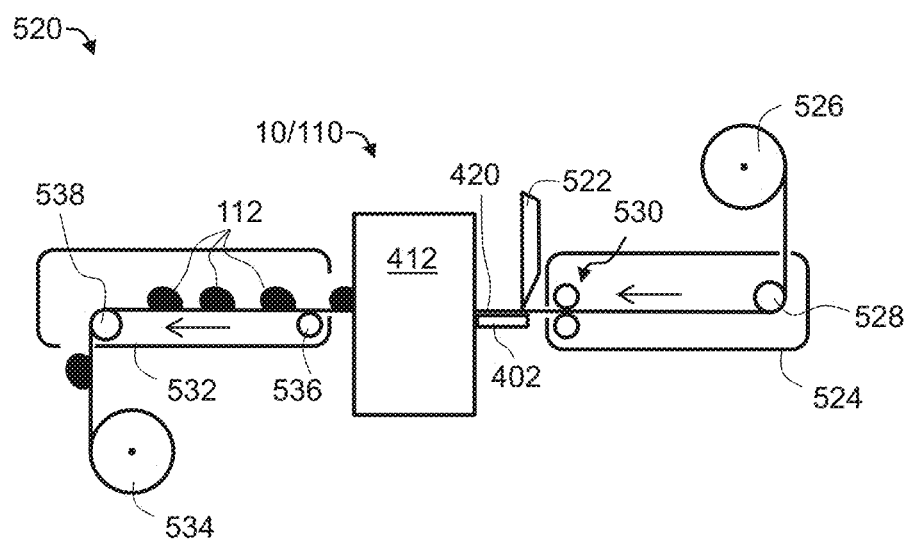
FIG. 9 is a schematic illustration of a system suitable for unrolling a fabric roll and printing on the unrolled fabric, according to some embodiments of the present invention.

Reference is now made to FIG. 9, which is a schematic illustration of a system 520 suitable for unrolling a fabric roll and printing on the unrolled fabric. System 520 comprises printing chamber 412 having therein an array of nozzles for dispensing building materials, and a work tray. For example, chamber 412 can include the components of system 10 and/or 110 as further detailed hereinabove. System 520 can also comprise a computerized controller (not shown), such as, but not limited to, controller 20, as further detailed hereinabove. System 520 further comprises a fabric let-off 524 for unrolling a fabric roll 526, and feeding the fabric 420, once unrolled, into printing chamber 412.

Fabric let-off 524 can be of any type known in the art. In some embodiments of the present invention let-off 524 controllably advances fabric roll 526 and maintains a substantially constant tension condition in the fabric. Preferably, the control of let-off 524 over the advance of fabric roll 526 is responsive to changes in the diameter of fabric roll 526 and also to the tension of the fabric. Preferably, let-off 524 is controlled by controller 20 (not shown in FIG. 9). Typically, let-off 524 moves a tension roller 528 so as to move the fabric towards chamber 412. The tension roller 528 is typically biased to apply tension to the fabric. A feeder 530 receives the fabric from tension roller 528 and feeds it into chamber 412, preferably in horizontal orientation. In embodiments in which jig 402 is employed, feeder 530 optionally and preferably operates in coordination with robotic mechanism 410 (not shown in FIG. 9, see FIG. 4A-5B) wherein feeder 530 places fabric 420 on jig 402 and robotic mechanism 410 introduces jig into chamber 412 as further detailed hereinabove.

In some embodiments of the present invention system 520 comprises a cutting device 522 for cutting sections of the unrolled fabric 420. For example, cutting device 522 can cut sections of the size of jig 402. Preferably, cutting device 522 is positioned at the outlet of feeder 530 of let-off 524. In some embodiments, system 520 comprises a fabric take-up 532 for rolling fabric 420 following the fabrication of the three-dimensional object(s) thereon as described herein. These embodiments are useful when it is desired to provide a continuous fabric roll 534 printed with three-dimensional objects 112 thereon. This can be achieved by continuously feeding of the fabric into printing chamber 412 without cutting. Fabric take-up 532 can be similar in its principle and operation to fabric let-off 524 except that it is configured for receiving the unrolled fabric 420 from chamber 412 and feeding it onto roll 534 for rolling. Fabric take-up 532 can therefor comprise a fabric receiver roller 536 for receiving the unrolled fabric 420 from chamber 412 and a take-up tension roller 538 that applies tension to the fabric and feeds it onto roll 534.

Figure 10:
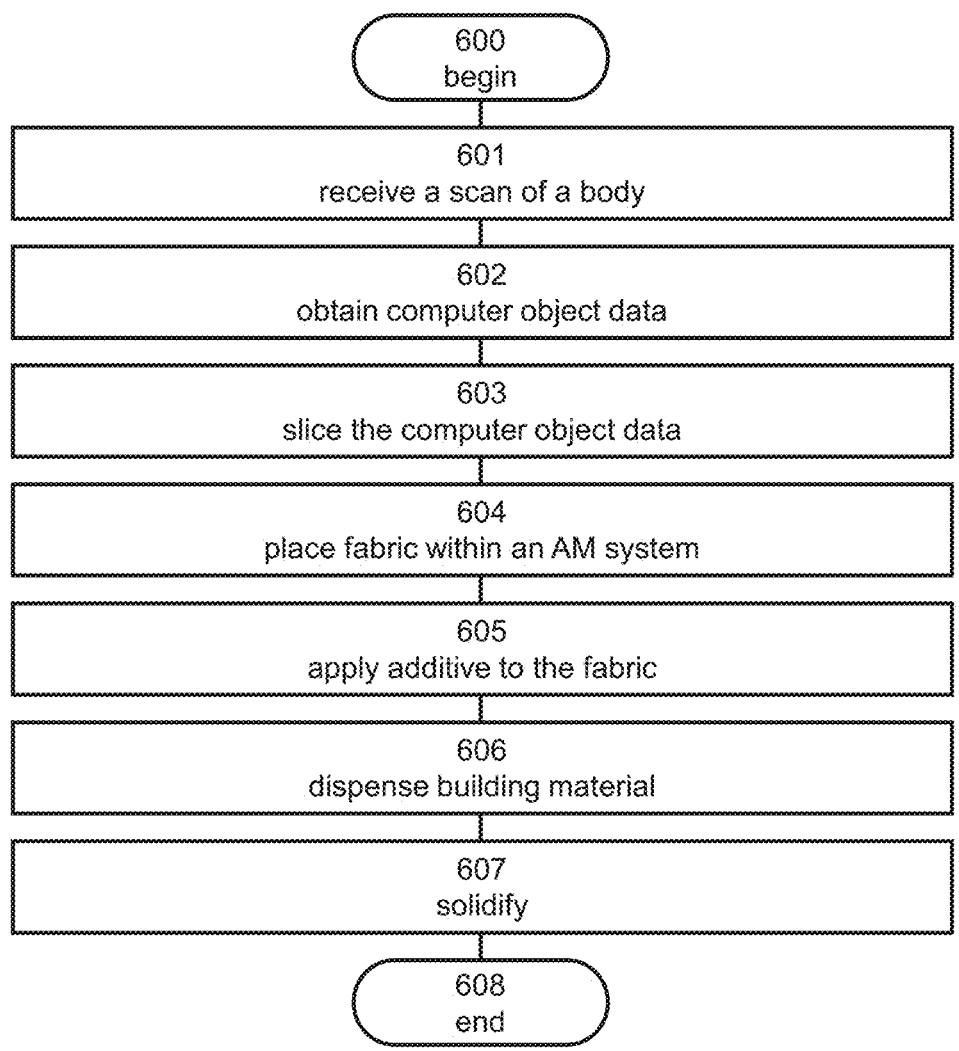
FIG. 10 is a flowchart diagram of a method suitable for printing a three-dimensional object on a fabric according to some embodiments of the present invention.

Reference is now made to FIG. 10 which is a flowchart diagram of a method suitable for printing a three-dimensional object on a fabric according to various exemplary embodiments of the present invention.

It is to be understood that, unless otherwise defined, the operations described hereinbelow can be executed either contemporaneously or sequentially in many combinations or orders of execution. Specifically, the ordering of the flowchart diagrams is not to be considered as limiting. For example, two or more operations, appearing in the following description or in the flowchart diagrams in a particular order, can be executed in a different order (e.g., a reverse order) or substantially contemporaneously. Additionally, several operations described below are optional and may not be executed.

The method of the present embodiments can be executed by the computerized controller (e.g., controller 20) of system 10 or 110.

The method begins at 600 and optionally and preferably continues to 602 at which computer object data are obtained, for example, from an external source. The computer object data can include a plurality of graphic elements (e.g., a mesh of polygons, non-uniform rational basis splines, etc.) defining a surface of the object. In some embodiments of the present invention the graphic elements are transformed to a grid of voxels defining the shape of the object, for example, using a slicing procedure 603 that form a plurality of slices, each comprising a plurality of voxels describing a layer of the 3D object. Alternatively, the method can receive sliced computer object data from an external source, e.g., a computer readable medium, in which it is not necessary to execute operation 603.

Since the grid of voxels and the plurality of graphic elements describe the same object, the term "computer object data" is used herein both in relation to the grid of voxels and in relation to the plurality of graphic elements. Thus, when the computer object data relate to the grid of voxels, each element of the computer object data is a voxel, and when the computer object data relate to the graphic elements each element of the computer object data is a graphic element, e.g., a polygon, a spline, etc.

In some embodiments of the present invention, at least part of the computer object data is obtained from a scan of a body of an individual human or animal (e.g., a three-dimensional image of the body). In these embodiments, the method receives 601 a scan of a body of an individual or an external body part thereof. Based on the scan, the method can select at least one property of the object. For example, when the system comprises cutting device 522 the size of the fabric sections that are cut can be selected based on the scan. Another example is a selection of the positions of the object to be fabricated relative to the fabric based on the scan. For example, when it is desired to fabricate a garment with an object at a specific location relative to the body of the individual, the scan data obtained at 601 can be used to transform the coordinate of the body to the coordinate of the fabric and so that once the garment is worn by the individual the object is aligned at the desired location.

The method continues to 604 at which the fabric is placed within an AM system. This can be done in more than one way. In some embodiments, the fabric is placed on the jig, either before or after the jig is introduced to the system (see, e.g., FIGS. 4C, 4D, 5A and 5B). In some embodiments, the fabric is placed directly on the tray and the jig affixes the fabric to the tray (see, e.g., FIGS. 4A, 4B, 4E and 4F). In some embodiments, the fabric is affixed to the ramp structure before or after the ramp structure is placed or mounted on the tray (see FIGS. 15A-C), and the vertical position of the tray is adjusted accordingly.

At 605 one or more additives are applied to the fabric, and at 606 one or more building materials are dispensed, as further detailed hereinabove. Operations 605 and 606 can be repeated and executed in any order of execution. Also, one or more building materials can be dispensed on a receiving surface before introducing the fabric into the system, so as to form objects on both sides of the fabric, as further detailed hereinabove (see, for example, FIGS. 6A-E and 7), and/or to form a sacrificial pedestal structure, as further detailed hereinabove.

At 607 the dispensed building material is solidified (for example, cured) by applying solidifying radiation.

The method ends at 608.

The method 600 can be used to fabricate many types of object on the fabric. In some embodiments of the present invention the method is executed for fabricating an object selected from the group consisting of a lenticular, a prismatic object, an object that is reflective to visible light, an object that is transparent to visible light but reflective to non-visible light, a fluorescent object, and a waveguide. In some embodiments, the fabricated object is capable of changing an optical, mechanical, and/or geometrical property in response to an environmental change, such as, but not limited to, a change in temperature, a change in humidity, a change in electromagnetic content of the environment, and the like. For example, the object can be made of an optically sensitive material that changes its color in response to a change in light condition or temperature.

In some embodiments of the present invention the method is executed for fabricating an object which comprises an agent such as, but not limited to, a pharmaceutical agent and/or a cosmetic agent. For example, the agent can be adsorbed on the surface of the object (e.g., by applying the agent to the building material as an additive) or the object can be in the form of a capsule containing the agent. Representative examples of pharmaceutical agent that can be incorporated in the object include, without limitation, an anti-bacterial agent and an anti-viral agent.

In some embodiments of the present invention the method is executed for fabricating an object which comprises a heating element capable of releasing heat or a cooling element capable of absorbing heat. In some embodiments the method is executed for fabricating an object which comprises a circuit, and in some embodiments the method is executed for fabricating an object which comprises a cavity for receiving a foreign object, such as, but not limited to, an electric circuit, or a magnetic element, or a light emitting element, or a chip, or a capsule containing a pharmaceutical or cosmetic agent.

In some embodiments of the present invention the method is executed for fabricating a female or a male part of a snap connector. These embodiments are particularly useful for fabricating garments, such as, but not limited to, seamless garments. In a representative example, illustrated in FIGS. 11A-C, building materials are dispensed on a first fabric element 610 to form a female snap connector 612 (FIG. 11A), and on a second fabric element 614 to form a male snap connector 616 (FIG. 11B). Thereafter, the female snap connector 612 is connected to the male snap connector 616 (FIG. 11C), thereby connecting the two fabric elements 610 and 614. The fabric elements 610 and 614 can be parts of the same garment, e.g., a pocket and trousers, a collar and shirt, the like.

In another representative example, illustrated in FIGS. 12A-B, building materials are dispensed on fabric element 610 to form female snap connector 612 and male snap connector 616 laterally displaced from female snap connector 612 (FIG. 12A). Thereafter, fabric element 610 is folded to align connectors 612 and 614, and female snap connector 612 is connected to the male snap connector 616 (FIG. 12B), thereby securing the fold. In these embodiments fabric element 610 can be a part of a garment, e.g., a sleeve, a sock, a seamless shirt, and the like.

In embodiments in which the controller receives a scan of a body, the scan data can be used to determine the locations and/or the number of the female and male snap connectors on the fabric element(s). For example, more snap connectors are typically printed for a larger body than for a smaller body.

In some embodiments of the present invention the method is executed for printing stitching elements for connecting fabrics, wherein, for example, a first fabric element and a second fabric element are aligned next to each other on a jig, optionally within a frame and building materials are dispensed on and between proximate edges of the aligned fabrics, to stitch them together. Stitching elements may also be formed on a fabric to provide folding lines.

The three-dimensional printing protocol according to which method 600 is executed can be selected by the operator of the system, or can be selected automatically. The operator can also be presented with one or more printing protocol, for example, using the user interface 116 of the system, and the operator can decide whether to execute the displayed protocol, modify it according to the operator's needs, or use a different protocol.

Figure 13:
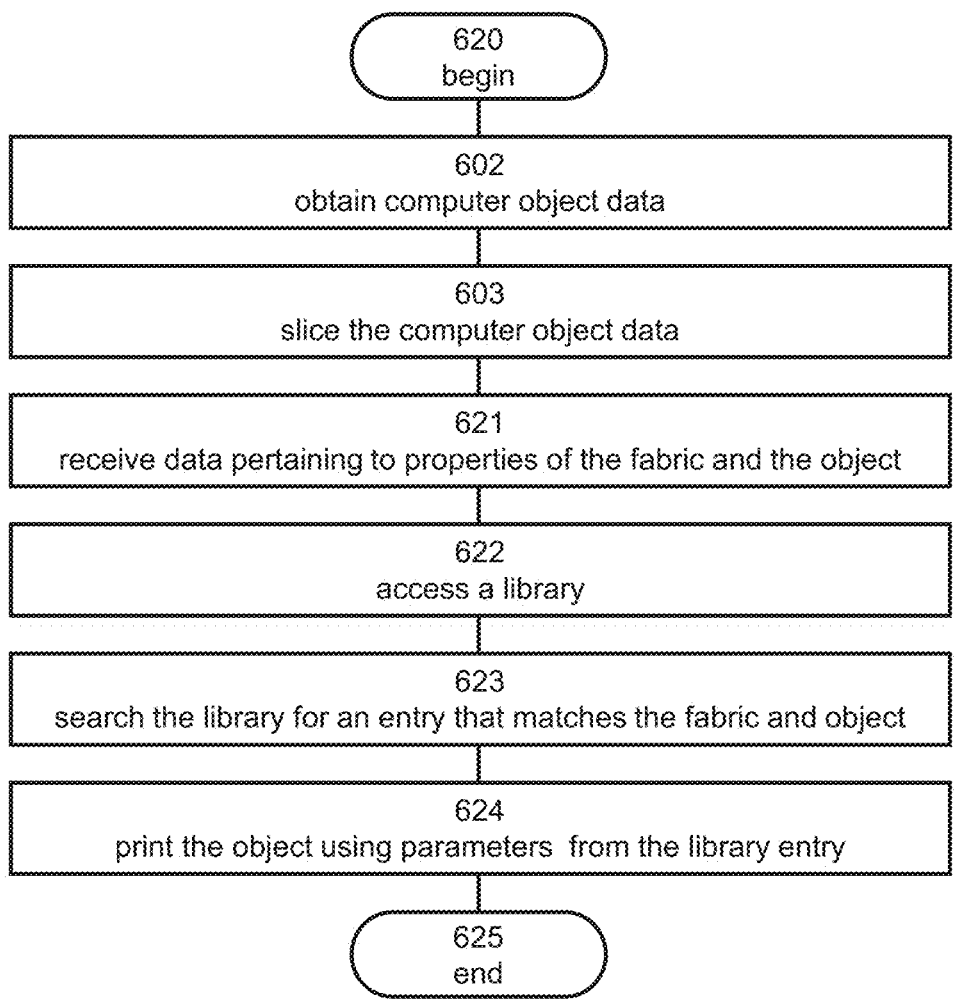
FIG. 13 is a flowchart diagram of a method suitable for printing a three-dimensional object on a fabric, in embodiments of the invention in which the system determines the printing protocol.

FIG. 13 is a flowchart diagram of a method suitable for printing a three-dimensional object on a fabric, in embodiments of the present invention in which the system determines the printing protocol.

The method begins at 620 and optionally and preferably continues to 602 and optionally to 603 as further detailed hereinabove. The method optionally and preferably extracts from the computer object data one or more geometrical properties of the object to be printed, typically a thickness, and optionally and preferably also a shape. Alternatively, the method can receive this property via the user interface of the system. Also contemplated is a combination of these options. For example, geometrical properties can be extracted from the computer object data, and non-geometrical properties, such as, but not limited to, rigidity, color, etc., can be obtained by the user interface.

The method continues to 621 at which the method receives, via the user interface of the system, data pertaining to a property of the fabric. Such data can include one or more of the type of the fabric, the average pore size of the fabric, the weaving pattern of the fabric and the like.

The method continues to 622 at which a computer readable medium storing a library is accessed. The library typically includes a plurality of entries, each including one or more library fabric properties, one or more library object properties, and a set of printing parameters. A representative example of a library 630 suitable for the present embodiments is illustrated in FIG. 14, including k sets of printing parameters, where the ith set of printing parameters (i=1, 2, . . . , k) corresponds to $n_i$ values of fabric properties, and $m_i$ values of object properties. Each of the k sets of printing parameters defines the printing protocol, and optionally and preferably includes the sequence of printing operations that is best suited to the particular object given the property or properties of the fabric. The set of printing parameters optionally and preferably comprises at least one of: (i) a priming solution application sequence, (ii) a building material, (iii) a building material dispensing sequence, and (iv) a finishing solution application sequence. In some embodiments of the present invention the set of printing parameters also comprises a dimension scaling factor allowing the method to up-scale or down scale the dimension of the object by the scaling factor.

Following are several examples for sets of printing parameters, which are not to be considered as limiting examples.

When the property of the fabric indicates that the average pore size of the fabric is sufficiently large to accommodate penetration elements 506 along the full depth of the pores, the set of printing parameters includes a sequence of operations that allows two-sided printing, such as, but not limited to, the sequence of operations described above with respect to FIGS. 6A-E and 7.

When the property of the fabric indicates that the fabric includes a sufficient amount of sufficiently long protruding fuzz fibers 424, and the property of the object indicates that the object is sufficiently thin or sufficiently low-weighted, the set of printing parameters can include a sequence of operations that allows one-side printing, such as, but not limited to, the sequence of operations described above with respect to FIG. 8A or 8B.

When the property of the fabric indicates that the fabric is suitable for applying an adhesive thereto for adherence of the object to the fabric, the set of printing parameters can include applying an adhesive to the fabric before dispensing the printing material.

When the property of the fabric indicates a particular weaving pattern of the fabric, the set of printing parameters can include a sequence of operations that includes registration of the fabric based on that particular weaving pattern.

When the property of the object indicates that a finishing solution is required (e.g., a finishing solution making the outer surface of the object more glossy, or more matte, or a finishing solution that protects the outer surface of the object), the set of printing parameters can include applying a finishing solution to the building material after the object is formed.

When the property of the object indicates that the object includes a plurality of discrete parts with sufficiently small gaps between adjacent discrete parts, the set of printing parameters can include selectively applying a masking solution to the fabric at the locations of the gaps before dispensing the building material. A similar set of parameters can be used when the property of the fabric indicates that it may be damaged by the curing radiation, in which case the set of printing parameters can include selectively applying a masking solution to the fabric at locations that are not to be occupied with objects before dispensing the building material.

When the property of the object indicates high rigidity, the set of printing parameters can include use of building materials that are more rigid after solidification, and optionally also up-scaling of the physical dimensions of the object. When the property of the object indicates low rigidity, the set of printing parameters can include use of building materials that are less rigid after solidification, and optionally also down-scaling of the physical dimensions of the object. These embodiments are typically realized by thresholding. Specifically, the library 630 preferably includes entries for different numeric rigidity ranges each being defined by one or two rigidity thresholds, wherein for each such entry the method compares the desired rigidity of the object as obtained from the user interface to the rigidity threshold(s) of the respective entry, and selects set of printing parameters based, at least in part, on this comparison.

The method continues to 623 at which the library 630 is searched for an entry that best matches the properties of the object and the fabric. Suppose for simplicity that the library 630 has a plurality of values that describe pore sizes of fabrics, and a plurality of values that describe the thickness of the object to be fabricated, for each pair of pore size value and object thickness value, there is a set of printing parameters. In this case the method finds the entry with a thickness value that that matches or approximately matches the thickness of the object and a pore size value that matches or approximately matches the pore size of the fabric. For example, the method searches through the library to find all the entries with a pore size value that matches or approximately matches the pore size of the fabric and then searches through these entries for the entry with a thickness value that that matches or approximately matches the thickness of the object. The method can then select the set of parameters from the found entry.

The method proceeds to 624 at which a three-dimensional printing system, such as, but not limited to, system 10 or 110 is operated according to the set of printing parameters of the found entry so as to form the object on the fabric.

The method ends at 625.

Examples of three-dimensional printing protocols suitable according to some embodiments of the present invention are described in the Examples section that follows.

As used herein the term "about" refers to ±10%.

The word "exemplary" is used herein to mean "serving as an example, instance or illustration." Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments." Any particular embodiment of the invention may include a plurality of "optional" features unless such features conflict.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non-limiting fashion.

Example 1

Printing without Pedestal

The fabric is positioned on the tray, and stable positioning is ensured. For example, the fabric can be placed on the jig, and the jig can be placed on the tray. Optionally, positioning marks (e.g., marks 414) are used for registration of the fabric on the tray. Optionally, one or more priming solutions are applied to the fabric. The z height of printing block can then be adjusted so that the zero height is at the level of the fabric. This operation is particularly useful in systems that automatically add a pedestal height to the z height. When printing without a pedestal, such automatic setting is preferably re-adjusted. The nozzle arrays are then activated to print penetration or adhesion elements on the fabric as further detailed hereinabove. The object is then printed on the penetration or adhesion elements.

Example 2

Anchoring by Two-Sided Printing

A pedestal structure is printed on a receiving surface or the tray of the system. Thereafter, securing elements (for example, 5 mm or less in thickness) are printed on the pedestal structure. The printing is then optionally and preferably paused, and the fabric is positioned on tray, preferably, but not necessarily, using the jig, and stable positioning is ensured. Optionally, positioning marks (e.g., marks 414) are used for registration of the fabric on the tray. Optionally, one or more priming solutions are applied to the fabric. The z height of printing block can then be adjusted so that the zero height is at the level of the fabric, once placed on the securing elements. The nozzle arrays are then activated to print penetration elements on the fabric to connect with the securing elements beneath the fabric as further detailed hereinabove. The object is then printed such that its bottommost layer connects with the penetration elements.

Example 3

Anchoring by Upside Down Two-Sided Printing

The fabric is placed on the jig. Optionally, one or more priming solutions are applied to the fabric. The nozzle arrays are then activated to print a pedestal structure on a receiving surface or the tray of the system. Thereafter, the object is printed on the pedestal structure. The printing is optionally and preferably paused for placing the jig on the printed object. Support material is optionally and preferably removed from the printed object. The z height of printing block can then be adjusted so that the zero height is at the level of the fabric, once placed on the printed object. The nozzle arrays are then activated again to print penetration elements on the fabric to connect with the object beneath the fabric, and then to print securing elements to connect with the penetration elements.

Example 4

Printing Objects on Opposite Sides of the Fabric

The fabric is placed on the jig. Optionally, one or more priming solutions are applied to the fabric. The nozzle arrays are then activated to print a pedestal structure on a receiving surface or the tray of the system, and thereafter to print a first object on the pedestal structure. The printing is optionally and preferably paused for placing the jig on the first object. Support material is optionally and preferably removed from the first object. The z height of printing block can then be adjusted so that the zero height is at the level of the fabric, once placed on the first object. The nozzle arrays are then activated again to print penetration elements on the fabric to connect with the first object beneath the fabric. A second object is then printed to connect with the penetration elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

In addition, any priority document(s) of this application is/are hereby incorporated herein by reference in its/their entirety.

The invention claimed is:

1. A system for three-dimensional printing, comprising:
an array of nozzles for dispensing building materials;
a work tray;
a structure having a planar surface mountable or placeable over said work tray to define a space above said work tray, wherein an upper surface of said structure is configured to support a horizontal portion of a fabric and said space is configured to receive a hanging portion of said fabric;
a jig configured for affixing said fabric to said structure; and
a computerized controller configured for operating at least said array of nozzles to dispense a building material in a configured pattern corresponding to a shape of an object on said affixed fabric, and for controlling said array of nozzles to dispense said building material only on said upper surface;
wherein said computerized controller is configured to adjust a vertical position of said work tray in a manner that an initial vertical position of said work tray is higher during operation of the system without said structure, than during operation of the system with said structure.

2. The system of claim 1, further comprising a robotic mechanism connected to said jig and configured for placing said jig on said structure.

3. The system of claim 2, wherein said robotic mechanism is configured for flipping an orientation of said jig with respect to a horizontal plane, while said jig holds said fabric.

4. The system of claim 2, wherein said computerized controller is configured for operating at least said array of nozzles to dispense said building material onto said structure, and to operate said robotic mechanism to place said jig on said structure, following said dispensing of said building material onto said structure and prior to said dispensing of said building material on said affixed fabric.

5. The system of claim 1, comprising a position tracking system configured for determining a position of said jig relative to said work tray, wherein said computerized controller is configured for executing registration procedure based on said position and to operate said array of nozzles responsively to said registration.

6. The system of claim 1, comprising a radiation source, and wherein said work tray has reflectivity of at least 50% to radiation emitted by said radiation source.

7. The system of claim 1, wherein said work tray comprises a fluid channel, and the system comprises a fluid delivery system for generating a flow of fluid within said fluid channel.

8. The system of claim 1, comprising an additive dispensing system in fluid communication with a container containing an additive other than a building material for three-dimensional printing, for dispensing said additive onto said fabric, wherein said array and said additive dispensing system are configured to move independently along a horizontal direction.

9. The system of claim 1, comprising an additive dispensing system in fluid communication with a container containing an additive other than a building material for three-dimensional printing, for dispensing said additive onto said fabric, wherein said array and said additive dispensing system are configured to move independently along a vertical direction.

10. A system for three-dimensional printing, comprising:
an array of nozzles for dispensing building materials;
a work tray;
a structure having a planar surface mountable or placeable over said work tray to define a space above said work tray, wherein an upper surface of said structure is configured to support a horizontal portion of a fabric and said space is configured to receive a hanging portion of said fabric;

an imaging system positioned for imaging said fabric; and a computerized controller configured for receiving image data from said imaging system, processing said image data to identify patterns on said fabric, for operating at least said array of nozzles to dispense a building material in a configured pattern corresponding to a shape of an object on said horizontal portion of said fabric at locations selected relative to said identified patterns, and for controlling said array of nozzles to dispense said building material only on said upper surface;

wherein said computerized controller is configured to adjust a vertical position of said work tray in a manner that an initial vertical position of said work tray is higher during operation of the system without said structure, than during operation of the system with said structure.

11. The system of claim 1, comprising a radiation source, wherein said work tray is operatively associated with said radiation source constituted to emit radiation upwards so as to solidify said dispensed building materials from below.

12. The system of claim 1, wherein an edge of a top surface of said structure is formed as at least one of a fillet and a chamfer.

13. The system of claim 1, wherein said object is selected from the group consisting of a lenticular, a prismatic object, an object that is reflective to visible light, an object that is transparent to visible light but reflective to non-visible light, a fluorescent object, and a waveguide.

14. The system of claim 1, wherein said object is capable of changing an optical, mechanical, and/or geometrical property in response to an environmental change.

15. The system of claim 1, wherein said object comprises a pharmaceutical agent or a cosmetic agent.

16. The system of claim 1, wherein said object comprises a heating element or a cooling element.

17. The system of claim 1, wherein said object comprises a circuit.

18. The system of claim 1, wherein said object comprises a cavity for receiving a foreign object.

19. The system of claim 1, wherein said object comprises a female or a male part of a snap connector.

* * * * *